United States Patent
Rau et al.

(10) Patent No.: US 7,655,193 B1
(45) Date of Patent: Feb. 2, 2010

(54) APPARATUS FOR EXTRACTING AND SEQUESTERING CARBON DIOXIDE

(75) Inventors: Gregory H. Rau, Castro Valley, CA (US); Kenneth G. Caldeira, Livermore, CA (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 920 days.

(21) Appl. No.: 10/901,313

(22) Filed: Jul. 26, 2004

Related U.S. Application Data

(60) Division of application No. 09/759,781, filed on Jan. 11, 2001, now Pat. No. 6,890,497, which is a continuation-in-part of application No. 09/314,220, filed on May 19, 1999, now abandoned.

(60) Provisional application No. 60/096,846, filed on Aug. 18, 1998.

(51) Int. Cl.
*B01J 8/00* (2006.01)
*B01D 53/40* (2006.01)

(52) U.S. Cl. ..................................... 422/169

(58) Field of Classification Search ................. 422/168, 422/169, 188; 423/220, 419.1, 420.2, 422, 423/430, 433, 437.1
See application file for complete search history.

(56) References Cited

U.S. PATENT DOCUMENTS 5,261,490 A * 11/1993 Ebinuma ..................... 166/266

FOREIGN PATENT DOCUMENTS

EP 0487102 * 5/1992

\* cited by examiner

*Primary Examiner*—Wayne Langel
(74) *Attorney, Agent, or Firm*—Thomas S. O'Dwyer; James C. Durkis; Paul A. Gottlieb

(57) ABSTRACT

An apparatus and method associated therewith to extract and sequester carbon dioxide ($CO_2$) from a stream or volume of gas wherein said apparatus hydrates $CO_2$ and reacts the resulting carbonic acid with carbonate. Suitable carbonates include, but are not limited to, carbonates of alkali metals and alkaline earth metals, preferably carbonates of calcium and magnesium. Waste products are metal cations and bicarbonate in solution or dehydrated metal salts, which when disposed of in a large body of water provide an effective way of sequestering $CO_2$ from a gaseous environment.

13 Claims, 8 Drawing Sheets

APPARATUS FOR EXTRACTING AND SEQUESTERING CARBON DIOXIDE

CROSS-REFERENCE TO RELATED APPLICATIONS

This application is a divisional of U.S. Non-provisional application Ser. No. 09/759,781, filed Jan. 11, 2001, which is a continuation-in-part of U.S. application Ser. No. 09/314,220, filed May 19, 1999, which claims the benefit of U.S. Provisional Application No. 60/096,846, filed Aug. 18, 1998.

STATEMENT REGARDING FEDERALLY SPONSORED RESEARCH OR DEVELOPMENT

The United States Government has rights in this invention pursuant to Contract No. W-7405-ENG-48 between the U.S. Department of Energy and the University of California.

REFERENCE TO A "SEQUENCE LISTING", A TABLE, OR A COMPUTER PROGRAM LISTING APPENDIX SUBMITTED ON A COMPUTER DISC (SEE 37 CFR 1.52(E)(5))

Not Applicable

BACKGROUND OF THE INVENTION

1. Field of the Invention

The present invention relates generally to an apparatus and method associated therewith for extracting carbon dioxide ($CO_2$) from a stream or volume of gas, and sequestering said $CO_2$ from the atmosphere or other gaseous environment. The invention particularly relates to an apparatus that utilizes carbonate and water to sequester said $CO_2$ as bicarbonate.

2. Description of Related Art

A variety of chemical means exist or have been proposed which consume $CO_2$ contained in emissions from fossil fuel combustion or other gas streams, thus reducing the potential atmospheric $CO_2$ burden (reviews by: H. Herzog and E. Drake, "Carbon Dioxide Recovery and Disposal From Large Energy Systems', Annual Reviews of Energy and Environment Vol. 21, p 145-166, 1996; X. Xiaoding and J. A. Moulijn, "Mitigation of $CO_2$ by Chemical Reactions and Promising Products", Energy and Fuels, Vol. 10, p 305-325, 1996). Among these chemical approaches, the exposure and reaction of such waste $CO_2$ to certain naturally occurring or artificially formed calcium-, magnesium-, sodium-, and/or silica-rich minerals has been explored as reviewed below. The reaction of certain carbonate and silicate minerals with $CO_2$ is a well-known "rock weathering" phenomenon that plays a major role in controlling atmospheric $CO_2$ on geologic time scales (R. A. Berner, A. C. Lasaga, and R. M. Garrels, "The Carbonate-Silicate Geochemical Cycle and its Effect on Atmospheric Carbon Dioxide Over the Last 100 Million Years", American Journal of Science, Vol. 283, p 42-50, 1983). Over the very long term such process are expected to eventually consume most of the $CO_2$ emitted by man's activities. The problem is that such natural processes occur on the order of >1,000 year time scales and thus will have little immediate impact on the rapidly increasing $CO_2$ emissions and atmospheric $CO_2$ burden in the coming centuries. Nevertheless, several researchers have proposed that certain weathering reactions be used to sequester $CO_2$, in particular those reactions which lead to $CO_2$ sequestration or storage in the form of solid carbonates.

For example, fixation and storage of $CO_2$ by artificial weathering of waste concrete in combination with coccolithophorid algae cultures was reported by H. Takano and T. Matsunaga, "$CO_2$ Fixation by Artificial Weathering of Waste Concrete and Coccolithophorid Algae Cultures", Energy Conversion Management, Vol. 36, No. 6-9. p 697-700, 1995. It was shown that $CO_2$ can be sequestered into biologically produced carbonate and biomass. Various mechanisms of rock weathering to fix $CO_2$ was discussed by T. Kojima, "Evaluation Strategies for Chemical and Biological Fixation/Utilization Processes of Carbon Dioxide", Energy Conversion Management, Vol. 36, No. 6-9, p 881-884, 1995. Studies of $CO_2$ fixation by silicate rock weathering were reported by T. Kojima, A. Nagamine, N. Ueno and S. Uemiya, "Absorption and Fixation of Carbon Dioxide by Rock Weathering", Energy Conversion Management, Vol. 38, Suppl., p S461-S466, 1997. Sequestering of $CO_2$ as carbonate by reaction with minerals rich in calcium and magnesium oxides was reported by K. S. Lackner, C. H. Wendt, D. P. Butt, E. L. Joyce, D. H. Sharp, "Carbon Disposal in Carbonate Minerals", Energy, Vol. 20, No. 11, p 1153-1170, 1995. Reacting flue gas $CO_2$ with water and soil to ultimately precipitate and sequester the $CO_2$ as carbonate was explored by T. Chohji, M. Tabata, and E. Hirai, "$CO_2$ Recovery From Flue Gas by an Ecotechnological (Environmentally Friendly) System", Energy, Vol. 22 No. 2/3, p 151-159, 1997. A study by H. Kheshgi ("Sequestering Atmospheric Carbon Dioxide by Increasing Ocean Alkalinity", Energy, Vol. 20, No. 9, p 912-922, 1995) looked at the option of adding calcium oxide to the ocean as a means of increasing the $CO_2$ absorption capacity of the ocean. The preceding approaches often require elevated temperatures or pressures, significant energy, land, or other resource inputs, and/or have negative environmental impacts. The cost of implementing these technologies is therefore often prohibitive.

As reviewed by H. Herzog and E. Drake, (Annual Reviews, loc. cit.) several chemical means exist for separating and concentrating $CO_2$ from gas streams. U.S. Pat. No. 4,376,101 (Sartori et al) discloses the removal of $CO_2$ from a gaseous stream via use of an aqueous solution containing an alkali metal salt or hydroxide and an activator or promoter system comprising an amine compound. While such processes remove or separate $CO_2$ from a waste stream, they offer no downstream method of ultimately sequestering the $CO_2$ from the atmosphere. They also often require elevated temperatures or pressures, exotic chemicals, and/or significant inputs of energy or resources.

Gas/water/calcium carbonate (limestone) reactors have been used in desulfurization of power plants exhaust as reviewed by H. N. Soud and M. Takeshita, "FGD Handbook, IEA Coal Research, London, 438 p., 1994. Such reactors differ from the present invention in three important aspects: 1) The volume of $SO_2$ in the gas streams to which desulfurization is applied is vastly smaller than the $CO_2$ content in the same gas stream; 2) The hydration step in carbonate desulfurization involves combining $SO_2$ with $H_2O$ to form the strong acid $H_2SO_3$. In contrast, the hydration of $CO_2$ envisioned here forms carbonic acid $H_2CO_3$, a weak acid which has a slower reaction rate with carbonate than does $H_2SO_3$. 3) The reaction of $H_2SO_3$ with carbonate (e.g., $CaCO_3$) and oxygen forms a solid, $CaSO_4$, and a gas, $CO_2$, whereas the $H_2CO_3$ with carbonate reaction forms cations and bicarbonate in solution, does not require supplemental oxygen, produces little or no solid waste, and consumes rather than generates gaseous $CO_2$.

U.S. Pat. No. 5,100,633 (Morrison) describes a process for scrubbing acid-forming gases which include $SO_2$ and $CO_2$ from an exhaust gas stream through reactions with alkaline solutions formed from the waste ash from biomass burning. The resulting alkali metal salts are then precipitated or dewatered forming solid, possibly useful waste products. This process does not provide a system for net $CO_2$ sequestration, however, considering that the molar ratio of carbon to alkali metals or to alkaline earth metals in the end products is many times lower than that ratio in the original biomass burned to form the alkaline ash. That is, only a very small fractional equivalent of the $CO_2$ released in biomass combustion can be sequestered by this process, and therefore when initial ash and $CO_2$ formation are considered the overall process is a net source rather than a net sink for $CO_2$.

The chemical reactions involving $CO_2$ gas, water, and carbonate minerals (principally calcium carbonate) have been extensively studied as reviewed by J. W. Morse and F. T. Mackenzie ("Geochemistry of Sedimentary Carbonates", Cambridge, Amsterdam, 707 p., 1990) and by T. Arakaki and A. Mucci ("A Continuous and Mechanistic Representation of Calcite Reaction-Controlled Kinetics in Dilute Solutions at 25° C. and 1 Atm Total Pressure", Aquatic Geochemistry, Vol. 1, p 105-130, 1995). However, the context of these studies has been to describe the dissolution or precipitation of solid carbonate under various conditions, not the consumption and sequestration of $CO_2$.

Due to its relative simplicity, low-cost, and low environmental impact, it is believed that the invention herein disclosed offers distinct advantages over other methods for the combined process of extracting $CO_2$ from waste gas streams and sequestering this $CO_2$ from the atmosphere.

BRIEF SUMMARY OF THE INVENTION

An object of this invention is a method and apparatus for extracting carbon dioxide ($CO_2$) contained in a stream or volume of gas, and sequestering this $CO_2$ from the stream of volume of gas.

A further object is a method and apparatus which accomplishes said $CO_2$ extraction and sequestration without the requirement of elevated temperatures, pressures, and without significant expenditures of energy or other resources.

A further object is a method and apparatus which utilizes $H_2O$ and carbonate.

A further object is a method and apparatus in which the reactants are relatively abundant and inexpensive, and the end products and process waste streams are environmentally benign.

A further object is a method and apparatus whose relative simplicity and low cost allow it to be widely employed, therefore impacting $CO_2$ emissions potentially at the global scale.

A further object is a method and apparatus which can utilize a wide range of fresh- and salt-water sources.

A further object is a method and apparatus which is flexible in siting requirements allowing location near $CO_2$ sources, carbonate, and/or water sources.

It is known that carbonic acid reacts with certain metal carbonates to form metal ions and bicarbonate in solution. Such a reaction is employed in the invention to provide a means of extracting and sequestering $CO_2$ from a stream or volume of gas.

One embodiment of the present invention is an integrated apparatus comprising a reactor vessel containing carbonate. A gas stream containing $CO_2$ enters the reactor vessel. In the reactor vessel, $CO_2$ contacts an aqueous solution and becomes hydrated to form carbonic acid, which in turn reacts with the carbonate to form bicarbonate and metal ions. Waste streams exiting the reactor vessel comprise a gas stream now depleted of $CO_2$, and an aqueous solution of metal ions and bicarbonate.

Another embodiment of the present invention is a sequential apparatus comprising a hydration vessel and a carbonate reaction vessel. A gas stream containing $CO_2$ enters the hydration vessel. In the hydration vessel, $CO_2$ contacts an aqueous solution and becomes hydrated to form carbonic acid. The carbonic acid is transported to the carbonate reaction vessel where it reacts with carbonate located therein, to form bicarbonate and metal ions. Waste streams comprise a $CO_2$-depleted gas stream exiting the hydration vessel and an aqueous solution of metal ions and bicarbonate exiting the carbonate reactor vessel.

The apparatus may be used in any application where the extraction and sequestration of at least part of the $CO_2$ contained in a gas stream or volume is desired. Such applications include but are not limited to $CO_2$ extraction from waste gas associated with: i) the combustion or processing of coal, petroleum, natural gas, or other fossil fuel, or organic compounds derived from the preceding, ii) the combustion, processing, or metabolism of biomass such as wood, peat, plant products, or organic compounds derived thereof, iii) the decarbonation of limestone in the production of lime, cement, and gypsum. The process may also be used to reduce the $CO_2$ burden in less concentrated sources such as bulk air.

BRIEF DESCRIPTION OF THE SEVERAL VIEWS OF THE DRAWING(S)

These and other features, aspects, and advantages of the present invention will become better understood with regard to the following description, appended claims, and accompanying drawings wherein:

DETAILED DESCRIPTION OF THE INVENTION

Figure 1:
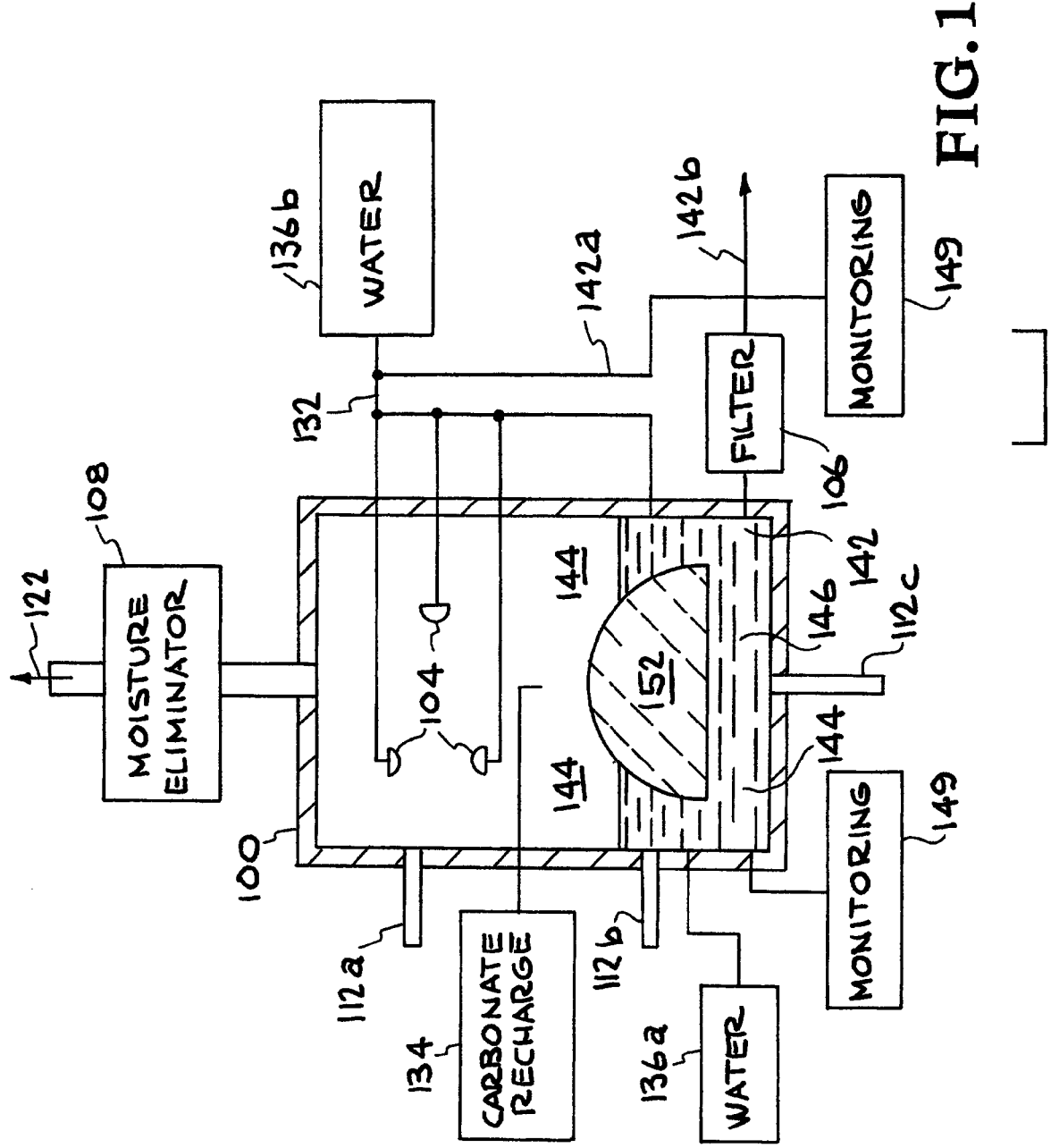
FIG. 1 illustrates one embodiment of the present invention comprising an integrated configuration that extracts and sequesters $CO_2$ from a gas stream in which $CO_2$ is hydrated and reacted with carbonate in an integrated hydration carbonate reactor vessel.

Definitions alkali metals—elements found in column IA of the periodic table of elements
alkaline earth metals—elements found in column IIA of the periodic table of elements
carbon dioxide—$CO_2$
carbonate—metal carbonate
carbonate compensation depth (CCD)—the depth in the ocean at which the rate of carbonate dissolution equals the rate of carbonate precipitation
carbonate group—$CO_3$
carbonate ion—$CO_3^{2-}$
carbonate solution—carbonate particles in suspension or slurry, and/or dissolved in solution
$CO_2$-depleted gas stream—a gas stream where some or all of its initial $CO_2$ has been removed
dissolved carbonate—metal ions and carbonate ions in solution
metal carbonate—chemical compound of the form $X(CO_3)_m$ where X is any element or combination of elements that can chemically bond with a carbonate group or its multiple, wherein at least one element is a group IA, IIA, IIIA, IVA, IB, IIB, IIIB, IVB, VB, VIB, VIIB, or VIIIB element of the periodic table, and m is a stoichiometrically determined positive integer. Examples of X include but are not limited to alkali metals and alkaline earth metals.
metal ion—one of the resulting cations formed when metal carbonate $X(CO_3)_m$ has reacted with carbonic acid, wherein the cation is found in solution with bicarbonate, and m is a stoichiometrically determined positive integer.
pycnocline—a region of high vertical density gradients in the ocean which acts as a barrier to mixing, essentially isolating the surface mixed layer from the deeper waters and above which seawater is well-mixed and contacted with the atmosphere relative to waters below.
$SO_2$- and $CO_2$-depleted gas stream—a gas stream where some or all of its initial $SO_2$- and $CO_2$ have been removed
wetted carbonate—static or moving bed, pile, or aerosol composed of carbonate particles wetted by an aqueous solution

Abbreviations aq—aqueous
Ca—calcium
$CO_2$—carbon dioxide
$CO_3$—a carbonate group
$CO_3^{2-}$—carbonate ion
$HCO_3^-$—bicarbonate ion
$H_2CO_3$—carbonic acid
$H_2O$—water
Mg—magnesium
Na—sodium
$pCO_2$—the partial pressure of $CO_2$ gas
pH—the negative logarithm of the hydrogen ion concentration
$SO_2$—sulfur dioxide
$SO_3$—sulfite
$SO_4^{2-}$—sulfate
X—any element or combination of elements that can chemically bond with a carbonate group or its multiple, wherein at least one said element is a group IA, IIA, IIIA, IVA, IB, IIB, IIIB, IVB, VB, VIB, VIIB, or VIIIB element of the periodic table.
X(aq)—any element or combination of elements in solution that can chemically bond with a carbonate group or its multiple, formed when $X(CO_3)_m$ dissolves in a solution.
$X(CO_3)_m$—carbonate composed of X bonded to one or more carbonate groups, where m is a stoichiometrically determined positive integer.

The inventive method and apparatus utilize a process comprising two main steps. In step 1, gaseous $CO_2$ is hydrated to form carbonic acid, as shown in equation 1:

$$CO_2(gas)+H_2O => H_2CO_3(aq). \quad (1)$$

In step 2, the hydrated $CO_2$ is reacted with a metal carbonate, in solid or dissolved form, to form metal cations and bicarbonate in solution. When the hydrated $CO_2$ or carbonic acid is reacted with a metal carbonate in solid form, this reaction may be represented as shown in equation 2a:

$$mH_2CO_3(aq)+X(CO_3)_m(solid) => X(aq)+2mHCO_3^-(aq). \quad (2a)$$

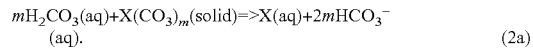

When the hydrated $CO_2$ or carbonic acid is reacted with a metal carbonate in dissolved form, this reaction may be represented as shown in equation 2b:

$$H_2CO_3(aq)+CO_3^{2-}(aq) => 2HCO_3^-(aq). \quad (2b)$$

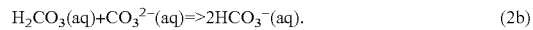

Equation 2b implies that the metal carbonate has already undergone a dissolution reaction, which may be represented by equation 3:

$$X(CO_3)_m(solid) => X(aq)+mCO_3^{2-}(aq). \quad (3)$$

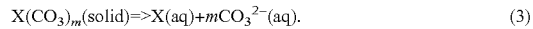

In step 2, X may represent any element or combination of elements that can chemically bond with the $CO_3^{2-}$ or its multiple, and wherein at least one element is a group IA, IIA, IIIA, IVA, IB, IIB, IIIB, IVB, VB, VIIB, VIIB, or VIIIB element of the periodic table. Because of their natural abundance and reactivity, X would be preferably represented by a member or members of the group IA and group IIA elements. Carbonates relevant to such a reaction include but are not limited to $CaCO_3$, $CaMg(CO_3)_2$, $MgCO_3$, and $Na_2CO_3$. For large scale applications X represented by Ca would be preferred because of the relatively high natural abundance and low cost of $CaCO_3$ (for example, as contained in limestone). Other sources of carbonates include, but are not limited to, calcite, dolomite and aragonite. X(aq) represents one or more ions in solution containing the elements composing X.

$CO_2$ Hydration

In the present invention, $CO_2$ in a gas stream may be hydrated in various ways: by passing the gas stream through an aqueous solution whose surface area is enhanced, preferably by spraying or atomizing, by bubbling the gas stream into an aqueous solution, and/or by passing the gas stream over or through wetted carbonate. The gas stream may encounter the aqueous solution or wetted carbonate vertically, horizontally, or at some other angle. This gas introduction may be assisted by a compressor or other means well known in the art. This may be particularly relevant when the gas stream is bubbled into an aqueous solution, or passed through wetted carbonate that is submerged, where resistance to gas flow from the aqueous solution and/or carbonate particles is expected. Introduction of gas below wetted carbonate may serve to partially or completely fluidize the particle bed, enhancing gas-aqueous solution-carbonate contact. In this configuration the $CO_2$ hydration occurs in close proximity to the carbonate-carbonic acid reaction, and both reactions are facilitated by the flow of gas and acid solution around the carbonate. The incoming gas is thus exposed to a large surface area of aqueous solution in the form of droplets and wetted carbonate surfaces, facilitating hydration of $CO_2$ to form a carbonic acid solution within the reactor.

Carbonate Forms

In the present invention, the carbonate may be presented to the carbonic acid in solid phase form, or in liquid phase form. Preferred carbonate forms include: i) pile or bed of particles (or chunks, slabs or blocks), ii) liquid slurry or suspension of particles, iii) solution of dissolved carbonate, or iv) solution or particle aerosol; over or through which the carbonic acid solution from step 1 is passed.

If the carbonate used is relatively insoluble in water, e.g., the calcium carbonate contained in limestone, then its reaction with carbonic acid in the aqueous solution will occur largely as a reaction between a liquid (carbonic acid containing solution) and a solid (limestone). Because of the abundance and relative low cost of the latter type of carbonate, the use of this carbonate type seems preferred for large scale applications.

In such applications relatively water-insoluble carbonate will be presented to the gas and aqueous solution in the reaction as a bed, pile, slurry, suspension, or aerosol of carbonate particles. The particulate carbonate may be of homogeneous or heterogeneous size and shape ranging from very fine particles to large chunks. Prior to reaction with the carbonic acid, the original size and shape of the carbonate may be modified by crushing, etching, drilling, sawing, or otherwise forming the carbonate into sizes and shapes advantageous for step 2. Because the overall rate of step 2 will be a function of the surface area of the particles exposed to the aqueous solution, the greatest surface area and hence greatest reaction rate per unit reactor volume will be achieved with the smallest sized carbonate particles. In such cases the particles in contact with the aqueous solution may form a suspension or slurry of particles depending on the size of the particles and the agitation or flow of the solution into which they are immersed. The size of such particle might be less than 0.1 mm. At the other extreme would be carbonate particle sizes, e.g., >10 cm whose individual mass would preclude prolonged suspension in air or solution and whose collective mass would then form a static bed, pile, or other configuration of carbonate particles. The aqueous solution, $CO_2$, and carbonic acid solution would then flow in or through the porous carbonate particle mass, facilitating carbonic acid-carbonate contact and possibly gaseous $CO_2$-aqueous solution contact. The advantage of such a scheme would be that less carbonate particle size reduction and associated cost by crushing (or other means common in the art) would be required. It would also preclude the added complexity of handling and pumping solutions containing suspended carbonate particles. With the bed/pile approach, a greater volume of particles and hence a larger reactor vessel size would be needed to attain an equivalent carbonate particle surface area within the reactor. Because it is unlikely and impractical that strict homogeneous particle sizes will be introduced into the reactor and because particle size reduction will occur in the reactor as particles of any size react with carbonic acid, it is likely that some intermediate between a static bed/pile and a dynamic suspension/slurry of carbonate will form in the reactor. The inclusion of carbonate particles in the reactor solution requires attention with regard to solution handling and pumping as will be discussed later.

If the form of the carbonate used is soluble in water, e.g. sodium carbonate, then a large portion if not all of the carbonate will be in ionic, dissolved form in aqueous solution. This means that the carbonic acid-carbonate reaction to form bicarbonate will occur mostly if not entirely in aqueous solution. In addition to the various modes of presenting the carbonic acid to the carbonate described earlier for solid phase carbonate, liquid phase carbonate may be presented to the carbonic acid via means well known in the art, such as spraying, atomizing, blowing, and presentation on wetted structures, or as a pool of liquid into which the gas stream is bubbled.

Introduction, Handling, and Removal of Water and Aqueous Solution

As step 2 proceeds, the aqueous mixture in proximity to the carbonate will become increasingly saturated with bicarbonate and the rate of bicarbonate formation will subsequently decline. It may be advantageous to bleed off or remove part of the mixture and replace this removed volume with aqueous solution which is relatively unsaturated with bicarbonate. The amount and timing of such removal will be dictated by the status of the solution chemistry and the desired reaction rates. By means well known in the art, monitoring of one or more solution chemistry parameters such as pH, $pCO_2$, conductivity, alkalinity, and/or metal ion concentration, either in the reactor solution or in the recirculating solution, is therefore desired.

Water may be added to, and solution effluent removed from, the reactor by pump, gravity feed, or other means well known in the art for liquid handling. Water addition may occur directly into the reactor or indirectly via addition to and mixture with recirculating aqueous solution prior to this mixture's introduction into the reactor. Also, carbonate solution may be added directly into the reactor or indirectly via addition to and mixture with recirculating aqueous solution prior to this mixture's introduction into the reactor.

The amount of water added to the reactor per unit time relative to the removal of waste solution effluent from the reactor will determine the solution level within the reactor. In various embodiments reactor solution may be maintained or varied at levels ranging from significantly above to significantly below the top level of the particulate carbonate bed/pile within the reactor. The liquid level will dictate the maximum height above the reactor base where solution can be withdrawn for recirculation or removal. For purposes of allowing carbonate particles to settle and for minimizing particulate load in the recirculated/removed waste solution, it would be advantageous to maintain the solution level and hence the solution outlet or outlets above the carbonate bed/pile level. On the other hand, maintaining liquid levels below the top of the carbonate bed/pile would expose the $CO_2$ gas within the reactor to a large wetted surface area formed by the exposed carbonate bed/pile as wetted by the aqueous solution spray, facilitating carbonic acid formation. In either case some carbonate particles may be entrained in the solution outflow which, if deleterious to pumps or other solution handling equipment, could be removed by filtration, settling, or other means well known in the art for liquid/solid separation.

Process Parameters

Certain process parameters which affect steps 1 and 2 may be varied to maximize the cost/benefit of a reactor's operation. For example, since high temperatures adversely affect the $CO_2$-hydration and carbonate-carbonic acid reactions, low temperatures are preferred within the range between the freezing and boiling points of water for a given operating pressure. Cooling means include those well known in the art for cooling liquids and gases; such may be passive (including radiator fins or heat sinks attached to the reactor vessels or process lines), active (indirect via heat exchanger or direct refrigeration), or a combination of the two. Such cooling means may be used to pre-cool the incoming gas stream, or to cool process particular process components including the recirculated gas stream, the gas contained in the reactor vessel, the aqueous solution, the carbonic acid, and/or such liquid as may be pooled in the reactor vessel. In addition, cooling may be achieved by having water recharge or replenishing carbonate at a lower temperature than the components in the reactor vessels. Higher total process pressures above ambient also benefit the hydration and carbonate reactions, serving to increase $CO_2$ solubility and carbonate reactivity with carbonic acid, and may be cost effective. Pressurizing means include those well known in the art such as a compressor to increase the pressure of the incoming gas stream or the gas contained within the reactor vessel. It is preferred that the highest possible concentration of carbonic acid solution be presented to the largest possible carbonate surface area, with the pH of the carbonic acid solution being as low as allowed by the operating temperature, the incoming gas stream's $pCO_2$, the water volume with which $CO_2$ is hydrated, and the effects of chemical additives (if any). Since the solution streams in the reactor will likely range from concentrated $H_2CO_3$ to concentrated $HCO_3^-$, pH variation (probably 4 to 8) will need to be considered in designing the reactor bed container, and the solution and gas handling and transport systems. Other parameters to consider include: i) the $CO_2$ concentration, flow rate, and chemical composition of the gas stream entering the reactor, ii) the particle size and total amount of carbonate and thus the total carbonate surface area within the reactor, iii) the rate of physical movement or agitation (if any) of the carbonate and carbonic acid solution, iv) the reactor temperature and/or pressure, and v) the chemical properties, flow rate, and recirculation of solution within the reactor.

Various embodiments according to the present invention are described hereunder with reference to FIG. 1. In these embodiments, the $H_2O$ hydration and carbonate reactions occur together in one integrated reactor vessel 100 ("integrated configuration"). The reactor vessel 100 comprises two regions: an upper region, and a lower region. An aqueous solution 132 is introduced into the upper region of reactor vessel 100 in the form of mist or droplets via atomizer/sprayer unit 104. The atomizer/sprayer unit 104 comprises at least one atomizer/sprayer positioned wherein the mist/spray is emitted horizontally, vertically upward or downward or other angle. Aqueous solution 132 may also be introduced directly into the lower region of the reactor vessel 100 as shown. Aqueous solution 132 comprises water and may include one or more of the following: dissolved carbon dioxide, carbonic acid, metal ions, bicarbonate, particulate carbonate and dissolved carbonate. A gas stream containing $CO_2$ enters the reactor vessel 100 by one or more entry ways (112a, 112b, and/or 112c). Gas stream 112a enters the upper region of reactor vessel 100. Contact between the gas stream 112a and atomized aqueous solution 132 serves to hydrate $CO_2$, forming carbonic acid 144. Aqueous solution 132 that is unreacted and carbonic acid 144 travel by gravity flow to the lower region of reactor vessel 100 where they impinge and wet carbonate 152 contained therein. The gas stream 112b enters the lower region of reactor vessel 100 and becomes hydrated as it bubbles through a region of unreacted aqueous solution 132 forming carbonic acid 144. Alternatively, gas stream 112b may be bubbled through unreacted aqueous solution 132 in the lower region of reactor 100 to form carbonic acid solution 144. The gas stream 112c enters the lower region of reactor vessel 100 and passes over or through wetted carbonate 152 wherein the $CO_2$ hydration and carbonate-carbonic acid reactions occur in close proximity. The gas stream 112c may be configured to pass over or through carbonate 152 in the vertical, horizontal, or other direction as may be desired. The $CO_2$-depleted gas stream 122 exits the reactor vessel 100. Prior to exiting from the reactor vessel 100, the gas stream 122 may be passed through a moisture-eliminator 108. The carbonic acid 144 reacts with carbonate 152 to form metal ion/bicarbonate solution 146. Mixture 142 comprises metal ion/bicarbonate solution 146, unreacted aqueous solution 132, and unreacted carbonic acid 144 which have pooled in the lower region of reactor vessel 100. Mixture 142 is bled from the reactor and disposed of as waste solution 142b and/or recirculated 142a. Water 136b may be added to mixture 142a as it is circulated back to atomizer/sprayer unit 104, or water 136a may be added directly to the lower region of the reactor vessel 100. Carbonate recharge means 134 is provides for adding carbonate to reactor vessel 100. To prevent entrainment of large particulate carbonate, mixture 142 may be passed through a solid/liquid separation means, such as a filter, 106. Portions of the carbonate 152 may extend above the liquid level of mixture 142, thereby exposing the carbonate 152 directly to the atomized aqueous solution 132 and carbonic acid 144. Monitoring means 149 is provided for measuring one or more solution chemistry parameters such as pH, $pCO_2$, conductivity, alkalinity, and/or metal ion concentration, in mixture 142 either within the reactor vessel 100 or as the mixture is transported outside of the reactor vessel 100.

Figure 2:
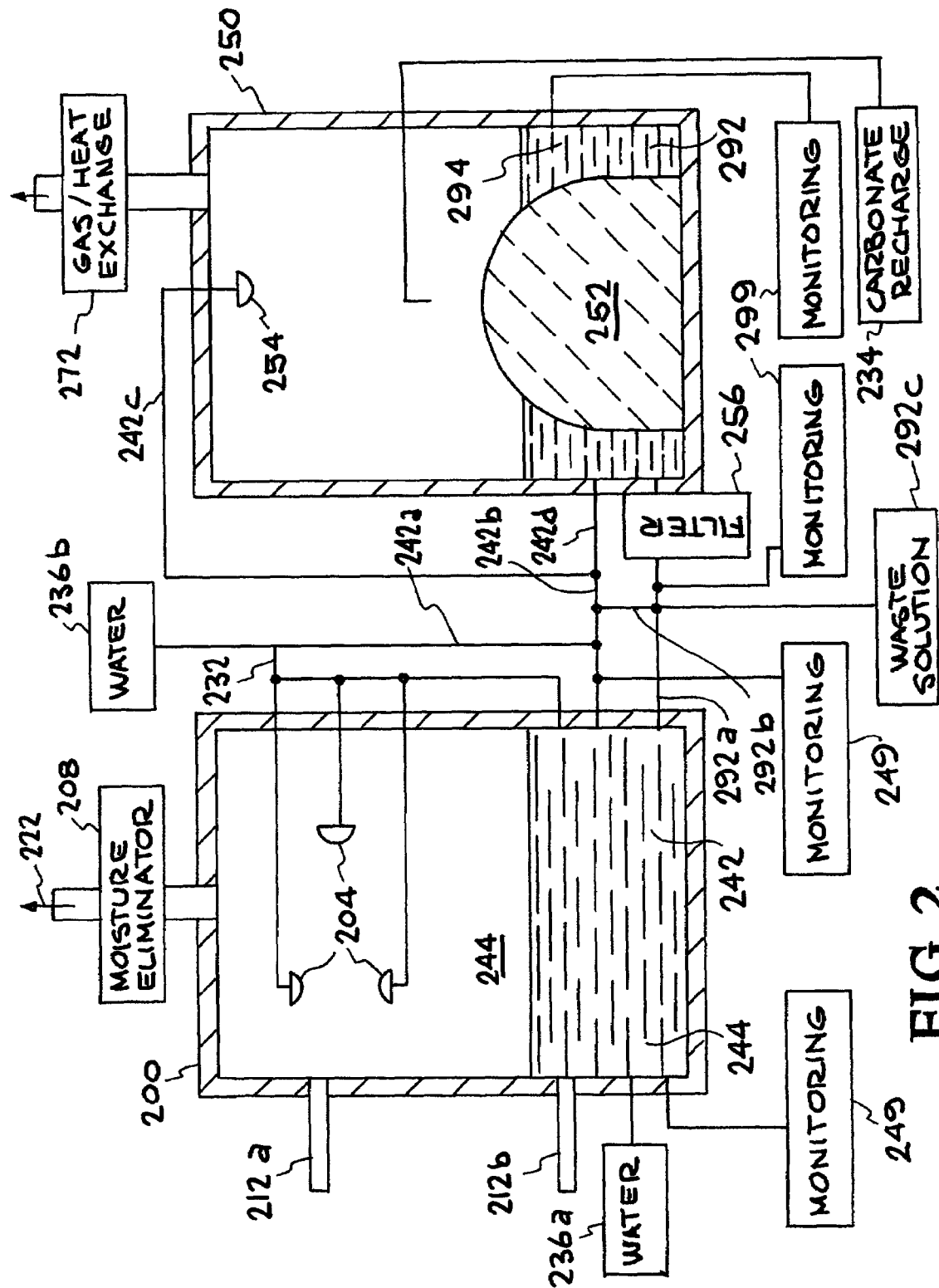
FIG. 2 illustrates another embodiment of the present invention comprising a sequential configuration that extracts and sequesters $CO_2$ from a gas stream in which $CO_2$ is first hydrated, then the resulting carbonic acid solution is separately reacted with carbonate.

Further embodiments according to the present invention are described hereunder with reference to FIG. 2. In these embodiments, ("sequential configuration"), $CO_2$ hydration occurs in a hydration-vessel and the carbonate-carbonic acid reaction occurs in a carbonate reaction vessel, with the hydration vessel being located upstream from the carbonate reaction vessel. Unless otherwise stated, similarly numbered components are analogous to components in the previous figure. The hydration vessel 200 comprises two regions: an upper region, and a lower region. An aqueous solution 232 is introduced into the upper region of hydration vessel 200 in the form of mist or droplets via atomizer/sprayer unit 204. The atomizer/sprayer unit 204 comprises at least one atomizer/sprayer positioned wherein the mist/spray is emitted horizontally, vertically upward or downward or other angle. Aqueous solution 232 may also be introduced directly into the lower region of hydration vessel 200. Aqueous solution 232 comprises water and may include one or more of the following: dissolved carbon dioxide, carbonic acid, metal ions, bicarbonate, particulate carbonate and dissolved carbonate. A gas stream containing $CO_2$ enters hydration vessel 200 via one or more pathways 212a,b. Gas stream 212a enters the upper region of hydration vessel 200. Contact between the gas stream 212a and aqueous solution 232 serves to hydrate $CO_2$ forming carbonic acid 244. The gas stream 212b enters the lower region of hydration vessel 200 and becomes hydrated as it bubbles through a region of unreacted aqueous solution 232 and carbonic acid 244. The $CO_2$-depleted gas stream 222 exits hydration vessel 200 as shown. Prior to exiting from the hydration vessel 200, the depleted gas stream 222 may be passed through a moisture eliminator 208. Mixture 242 comprises carbonic acid 244, aqueous solution 232, and may contain mixture 292. Mixture 242 is transported to carbonate reaction vessel 250 as shown in 242b, or recirculated 242a. Water 236b may be added to mixture 242a as it is recirculated back to atomizer/sprayer unit 204, or water 236a may be added directly to the lower region of the hydration vessel 200. Carbonate reaction vessel 250 comprises upper and lower regions. Mixture 242b may be introduced into the upper region of carbonate reaction vessel 250 in the form of mist or droplets 242c via atomizer/sprayer unit 254, and/or directly 242d into the lower region of carbonate reaction vessel 250. Mixture 242c and/or 242d react with carbonate 252 contained in the lower region of carbonate reactor 250 to form metal ions/bicarbonate solution 294. Mixture 292 comprises metal ion/bicarbonate solution 294 and unreacted mixtures 242c and/or 242d which have pooled in the lower region of carbonate reaction vessel 250. Mixture 292 is bled from the carbonate reaction vessel 250 and disposed of as waste solution 292c, recirculated 292a back to hydration vessel 200 for facilitating further $CO_2$ hydration, and/or recirculated 292b for mixing with mixture 242b. Carbonate recharge means 234 is provided for adding carbonate to the carbonate reactor 250. To prevent entrainment of large particulate carbonate, mixture 292 may be passed through a solid/liquid separation means, such as a filter, 256. Portions of the carbonate 252 may or may not extend above the liquid level of mixture 292, thereby exposing the carbonate 252 directly to the atomized mixture 242c. Carbonate reaction vessel 250 may also contain gas/heat exchange means 272 whereby gas is vented and heat may be exchanged with the ambient atmosphere to moderate interior gas pressure and temperature. Monitoring means 249 and 299 are provided for measuring one or more solution chemistry parameters such as pH, $pCO_2$, conductivity, alkalinity, and/or metal ion concentration, in mixtures 242 and 292 either within reactors 200 and 250, or in the effluent solution.

Hydration Enhancement

The object for step 1 is to efficiently obtain the highest possible carbonic acid concentration for the step 2 reaction. The efficiency of $CO_2$ hydration can be enhanced by:
  i) increasing the surface area of an aqueous solution in contact with a given volume of $CO_2$. Generally, for a given aqueous solution and $CO_2$ volume this can be accomplished by minimizing the size of the aqueous solution droplets, by maximizing the wetted surface area exposed to the $CO_2$, and/or agitating, mixing, flowing, or stirring the $CO_2$ and aqueous solution.
  ii) increasing the concentration of $pCO_2$ in the incoming gas stream, achieved by pre-concentrating the $CO_2$ in the gas stream, using means well known in the art, before the gas stream enters the reactor and/or increasing the total gas pressure within the reactor.
  iii) increasing $CO_2$ solubility by decreasing temperature.
  iv) adding chemical compounds which catalyze or enhance step 1 (e.g., carbonic anhydrase).

One means of maximizing the wetted surface area of an aqueous solution exposed to the $CO_2$ is achieved by use of high surface-area-to-volume-ratio structure(s). Such structures include porous materials, grates, grills, wires, mesh, screens, beads, balls, plates, fins, vanes, conveyor belts and other structures well known in the art of gas-liquid contacting (J. R. Fair, D. E. Steinmeyer, W. R. Penney and B. B. Crocker. "Gas Absorption and Gas-Liquid System Design, In: R. H. Perry, D. W. Green, and J. O. Maloney (eds.) Perry's Chemical Engineers' Handbook, 7th Ed., McGraw-Hill, New York, pg. 14-1 to 14-98, 1997 which is incorporated herein by reference). These structures may be stationary or in motion (linear, rotational, unidirectional and/or reciprocating), moved, shaken, vibrated, or otherwise agitated to further facilitate gas-solution contacting.

Various means are well known in the art for agitating the $CO_2$ and aqueous solution to increase contact. Such means may include mixers, mechanical or electromagnetic stirrers, blowers, spinners, shakers, vibrators or other agitating means well known in the art.

The carbonic acid solution may be recirculated for further $CO_2$ hydration with $CO_2$ to approach $CO_2$ saturation and hence the maximum carbonic acid concentration. The aqueous solution used in the $CO_2$ hydration step need not be pure $H_2O$, due either to recirculation of reacted water or the presence of other ions or chemicals in the water prior to use in step 1. Increasing the solution's ionic strength may adversely affect $CO_2$ solubility to a small extent. Sources of water, which may be used in step 1 which would contain a significant burden of ions and chemicals prior to reaction, include but are not limited to industrial waste water and seawater.

The solution effluent removed from the reactor will contain significantly elevated bicarbonate, carbonate, and $CO_2$ concentrations. If exposed to ambient air or other low-$CO_2$ gas, the differential in $CO_2$ concentration between air and the solution will cause $CO_2$ to degas from solution, increasing saturation state of the carbonate in solution, which could lead to the precipitation of solid carbonate from the solution. If such precipitation is undesired, it may be reduced or eliminated by copious dilution of effluent solution with water or other solution which is undersaturated with respect to carbonate. Carbonate precipitation may also be hindered by the addition to the effluent of certain ions such as $SO_4^{2-}$ and $PO_4^{2-}$ (Morse and Mackenzie, op cit.). Conversely, it may be advantageous to concentrate or solidify part or all of the bicarbonate/carbonate ion load in the effluent through effluent dewatering by means well known in the art, including drying, distillation, evaporation and membrane separation, described in Mark's Standard Handbook for Mechanical Engineers, eighth edition, pages 6-192 to 6-195, which is incorporated herein by reference. The resulting concentrated bicarbonate/carbonate slurry or solid could then be discarded, or used as chemical feedstock or other useful purpose. Since $CO_2$ dissolved in the effluent may come out of solution during the dewatering process, it may be advantageous to capture this $CO_2$. Further embodiments would include a means to capture and recirculate the water removed in the dewatering process for reuse in the $CO_2$ hydration step or for other uses, and/or a means of recirculating the captured $CO_2$ back to the reactor for hydration to form carbonic acid.

Figure 3:
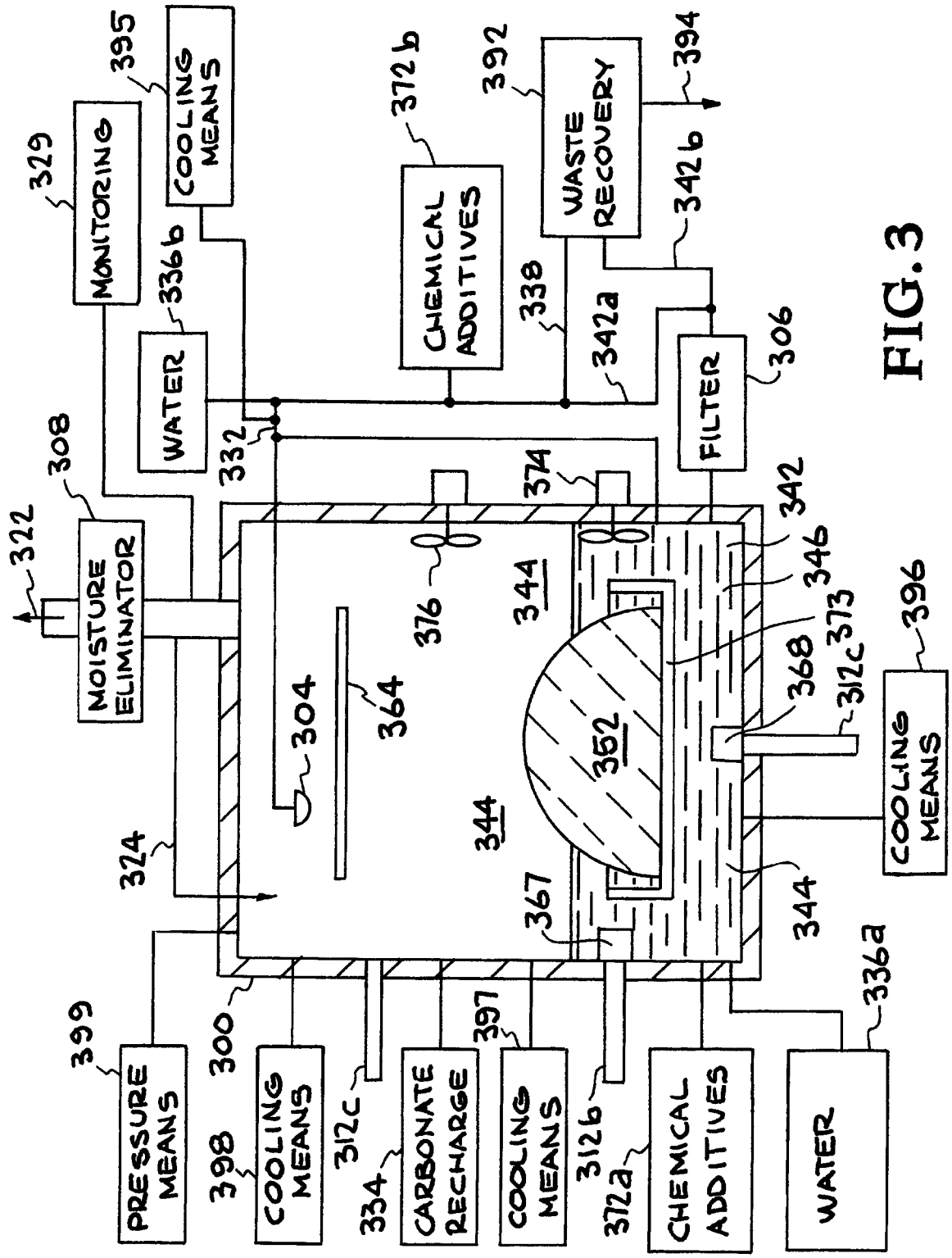
FIG. 3 illustrates further embodiments of the present invention comprising various means to enhance $CO_2$ hydration.

Further embodiments of the present invention comprising means to enhance $CO_2$ hydration are shown in FIG. 3. Although the embodiments are depicted for the integrated configuration, these hydration means are equally applicable to the sequential configuration as well. Unless otherwise stated, similarly numbered components are analogous to components in the previous figures. As stated earlier, $CO_2$ hydration may benefit from use of high surface-area-to volume-ratio structures. Screen 364, in the reactor vessel 300 upper region, partially intercepts and is contacted by the aqueous solution 332 and gas stream 312a thereby enhancing formation of carbonic acid solution 344. The $CO_2$-depleted gas stream 322 may be recirculated 324 back into reactor vessel 300 should further $CO_2$ removal be necessary. Monitoring means 329 is provided for monitoring the $CO_2$ concentration in gas stream 322. Prior to exiting from the reactor vessel 300, the gas stream 322 may be passed through a moisture-eliminator 308. Carbonic acid 344 reacts with carbonate 352 to form metal ion/bicarbonate solution 346. Mixture 342 comprises unreacted carbonic acid 344, aqueous solution 332 and metal ion/bicarbonate solution 346 which have pooled in the lower region of reactor vessel 300. Agitating means 374 may be located in the reactor vessel 300 lower region to enhance contact between the gas streams 312b, 312c, carbonate 352 and mixture 342. Agitating means 376 may be located in the reactor vessel 300 upper region to enhance contact between the gas stream 312a and aqueous solution 332. Gas streams 312b and 312c may be passed through gas diffusers 367 and 368 respectively to enhance dispersal of the gas into the collected liquid in the lower region of reactor vessel 300. Chemical additives, such as the $CO_2$-hydration-catalyst carbonic anhydrase, may be added to the reactor to enhance carbonic acid formation, 372b shown as being added to aqueous solution 332 and 372a shown as being added directly to reactor vessel 300. The carbonate 352 may be held in a liquid-porous/gas permeable container 373. The container 373 may be in motion (linear, rotational, unidirectional and/or reciprocating) which serves to enhance contact between the carbonate 352, aqueous solution 332, carbonic acid 344 and gas entering via pathways 312b or 312c. To prevent entrainment of large particulate carbonate, mixture 342 may be passed through a solid/liquid separation means, such as a filter, 306. Water 336b may be added to mixture 342a as it is recirculated back to atomizer/sprayer unit 304, or water 336a may be added directly to the lower region of the reactor vessel 300. Carbonate recharge means 334 is provided for adding carbonate to reactor vessel 300. Waste solution 342b may be passed to water recovery unit 392 which concentrates the metal ions/bicarbonates and extracts the water by means well known in the art. Reclaimed water 338 and/or $CO_2$ derived from unit 392 may be added 338 to mixture 342a as shown and recirculated to reactor 300. Concentrated metal ion/bicarbonate 394 exits component 392 as shown. Aqueous solution 332 may be passed through cooling means 395 to enhance $CO_2$ solubility. Mixture 342 may be passed through cooling means 396 to enhance $CO_2$ solubility. Cooling means 397 serves to cool the gas present in the upper region of reactor vessel 300 to enhance $CO_2$ solubility. Passive cooling means 398 serves to remove heat from the interior of reactor vessel 300 to enhance $CO_2$ solubility. Pressure means 399 serves to increase the total pressure in reactor vessel 300 to enhance $CO_2$ solubility.

Carbonic Acid/Carbonate Reaction Enhancement

Various means may be used to enhance the reaction of the carbonate with the carbonic acid. Although the carbonate-carbonic acid reaction is not restricted to the use of specific carbonate material sizes (allowable sizes may range from particles of less than 1 micron to greater than 1 meter, e.g., chunks, slabs or blocks), maximizing the surface area of the carbonate presented per volume of carbonic acid solution will maximize the overall rate of the reaction. For a given reactor volume, carbonate surface area is maximized by minimizing the size of the individual carbonate particles used in the reactor. Use of high surface-area-to-volume-ratio structures to hold, support or contact the carbonate could serve to increase the surface area of carbonate presented per volume of carbonic acid. Such structures include but are not limited to porous materials, grates, grills, plates, wires, mesh, screens, beads, balls, fins, vanes, liquid-porous containers, conveyor belts and other structures well known in the art. Such structures may be stationary or in motion (linear, rotational, unidirectional and/or reciprocating), moved, shaken, vibrated or otherwise agitated to facilitate carbonate/carbonic acid contact.

Although the carbonic acid solution is shown in the Figures as flowing vertically downward over/through the carbonate, the flow configuration is not limited to such. Flow may be vertically upward, horizontal, or at an angle as well. If the carbonate is a slurry, in suspension, dissolved in solution or in aerosol form, other ways of mixing the carbonate and carbonic acid solution may be used as well, including mixing the two components while airborne. The carbonate itself may be static or in motion, as may the structure(s) supporting or containing the carbonate. Having the carbonate in motion (such as a flowing slurry), or moving structure (such as a conveyor belt) may facilitate replenishment of the carbonate for a continuous operation. The direction of movement may be counter, tangential, parallel, or circular to the gas or solution flows or various combinations or these movements according to the desired efficiency of contacting the reactants.

For purposes of enhancing carbonic acid and carbonate contact it may be advantageous to agitate part or all of the reactor or its contents so as to reduce the boundary layer thickness between the unreacted carbonate and carbonic acid solution. Such agitation could be imparted externally to the reactor or to some or all of its contents by one or more shakers, mechanical or electromagnetic stirrers, mixers, spinners, blowers, vibrators, or other agitation means well-known in the art. The carbonate-carbonic acid reaction may also be enhanced by recirculation of unreacted carbonic acid solution within or through the reactor.

Enhanced carbonate-carbonic acid reaction may be achieved by lowering of the reaction temperature. Since the $CO_2$-hydration and carbonate-carbonic acid reactions are mildly exothermic, it may be advantageous to modulate reactor heat loss and hence reactor temperature, as well as varying aqueous solution, carbonic acid or gas flow rates or temperatures so as to maximize reaction rates while also preventing excessive $H_2O$ vaporization.

Step 2 (carbonate-carbonic acid reaction) is also enhanced by: i) decreasing the pH of the reacting solution, ii) increasing the ionic strength of the reacting solution, and iii) removing or chemically binding chemical impurities (e.g., certain metals, phosphate, sulfite, sulfate, fluoride and organic compounds) which may impede step 2. With regard to iii), if such contaminants deleterious to step 2 are present in the incoming gas or water streams, it would be advantageous to reduce, separate, or remove such contaminants from these streams prior to steps 1 or 2. One way of achieving this would to include chemical additives such as metal or ion chelators or chemical inhibitors of such contaminants (e.g., ethylene-diamine tetraacetate, EDTA) in aqueous solutions within the reactor.

Figure 4:
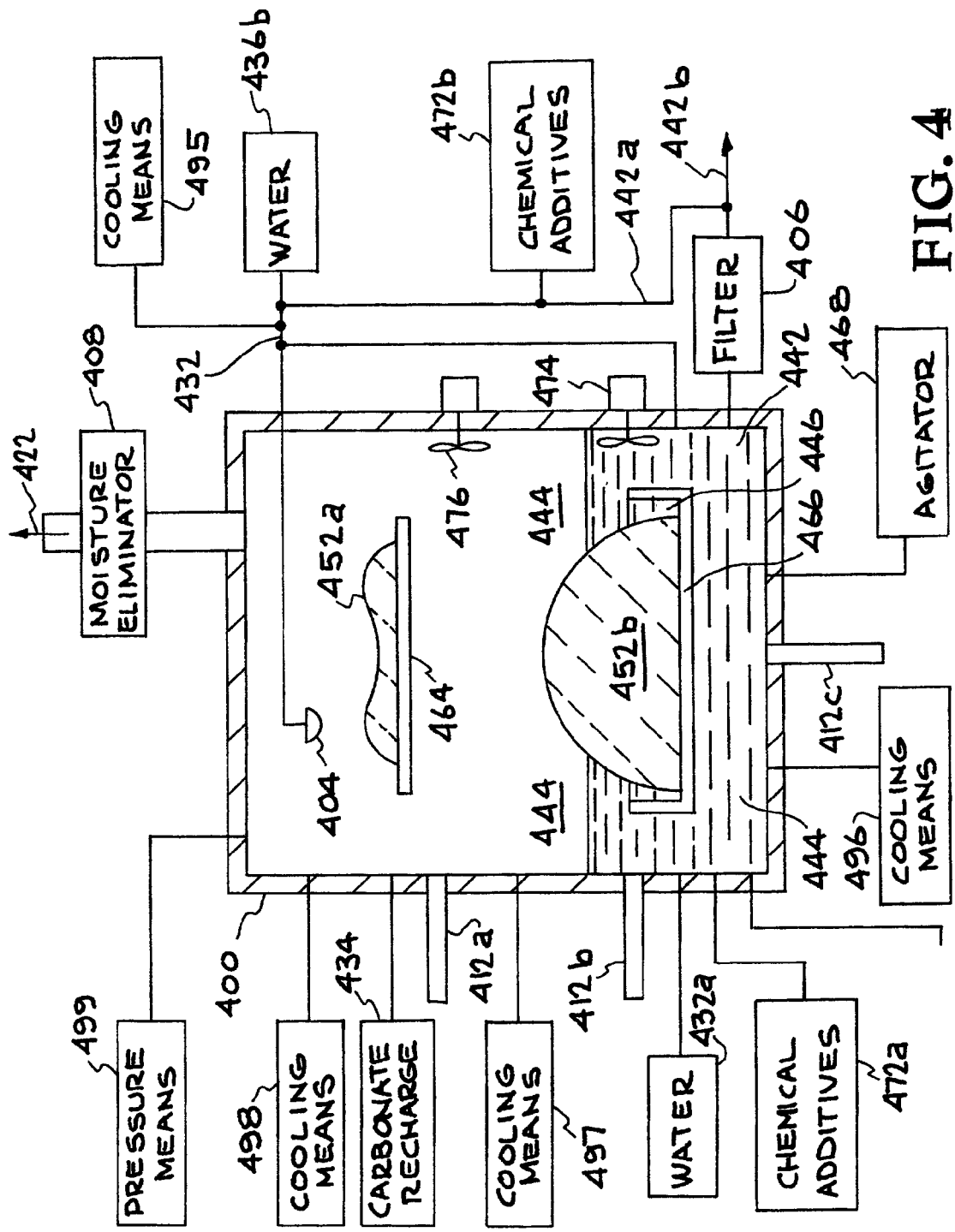
FIG. 4 illustrates further embodiments of the present invention comprising various means to enhance the carbonate-carbonic acid reaction.

Further embodiments of the present invention comprising various means to enhance the carbonate-carbonic acid reaction are shown in FIG. 4. Although the embodiments are depicted for the integrated configuration, these structures are equally applicable to the sequential configuration as well. Unless otherwise stated, similarly numbered components are analogous to components in the previous figures. In one embodiment, screen 464 is located in the upper region of reactor vessel 400 upon which carbonate 452a is disposed. Aqueous solution 432, emitted from atomizer/sprayer unit 404, impinges and wets screen 464 and carbonate 452a. Gas stream 412a passes over or through screen 464. Carbonic acid 444 is formed as $CO_2$ from the gas stream becomes hydrated by aqueous solution 432. As the gas stream 412a passes over wetted carbonate 452a, further carbonic acid 444 is formed and a carbonate-carbonic acid reaction occurs. Prior to exiting from the reactor vessel 400, $CO_2$-depleted gas stream 422 may be passed through a moisture-eliminator 408. Agitating means 476 may be located in the upper region of reactor vessel 400 to enhance contact between the gas stream 412a and aqueous solution 432. Mixture 442 comprises unreacted carbonic acid 444, aqueous solution 432 and metal ion/bicarbonate solution 446 which have pooled in the lower region of reactor vessel 400. Agitating means 474 may be located in the reactor vessel 400 lower region to enhance contact between the gas streams 412b and 412c, carbonate 452b, and mixture 442. Chemical additives, such as metal or ion chelators or chemical inhibitors, may be added to reduce contaminants that would interfere with the carbonic acid/carbonate reaction, 472b shown as being added to aqueous solution 432, and 472a shown as being added directly to the lower region of reactor vessel 400. Mixture 442 is bled from the reactor and disposed of as waste solution 442b and/or recirculated 442a. To prevent entrainment of large particulate carbonate, mixture 442 may be passed through a solid/liquid separation means, such as a filter, 406. Water 436b may be added to mixture 442a as it is recirculated back to atomizer/sprayer unit 404, or water 436a may be added directly to the lower region of the reactor vessel 400. Carbonate recharge means 434 is provided for adding carbonate to reactor 400. Carbonate 452b may be contained in a liquid-porous container 466 permeable to carbonic acid that is submerged in carbonic acid 444. Container 466 may be stationary or in motion relative to said carbonic acid 444. Reactor vessel 400 may further contain agitating means 468 which vibrates or shakes the lower region of reactor vessel 400. Aqueous solution 432 may be passed through cooling means 495 to enhance carbonate reactivity. Mixture 442 may be passed through cooling means 496 to enhance carbonate reactivity. Cooling means 497 serves to cool the gas present in the upper region of reactor vessel 400 to enhance carbonate reactivity. Passive cooling means 498 serves to remove heat from the interior of reactor vessel 400 to enhance carbonate reactivity. Pressure means 499 serves to increase the total pressure in reactor vessel 400 to enhance carbonate reactivity.

Carbonate Handling

The carbonate is introduced/replenished in the reactor either as dry particles, as wetted or immersed particles, or dissolved in ionic form in water or other appropriate aqueous solution using methods well known in the art of solids or solution transport including but not restricted to conveyor belts, pumps, blowers, and sprayers (e.g., D. A Dahlstrom and others, "Liquid-Solid Operations and Equipment", In: R. H. Perry, D. W. Green, and J. O. Maloney (eds.) Perry's Chemical Engineers' Handbook, 7th Ed., McGraw-Hill, New York, pg. 18-1 to 18-133, 1997.). The introduction of the carbonate may occur vertically, horizontally, or at some other angle relative to the reactor bed. Carbonate may be added to the reactor by various means, including a passive gravity feed or stream, or by active pumping, spraying, blowing, or conveying of dry, wet, or immersed carbonate particles or carbonate solution into the headspace or into the lower region of the reactor, in batch mode or continuous feed mode. In other embodiments, particulate carbonate within the reactor may be held by or fastened onto structures such as static or moving porous materials, grates, grills, plates, screens, wires, mesh, beads, balls, fins, vanes, conveyor belts, or held in liquid-porous containers, whose purpose is to facilitate carbonate addition to the reactor. As was stated earlier, lower temperatures facilitate the carbonate-carbonic acid reaction. Therefore it may be advantageous to replenish the carbonate with carbonate at a lower temperature than that in the carbonate reaction vessel.

Figure 5:
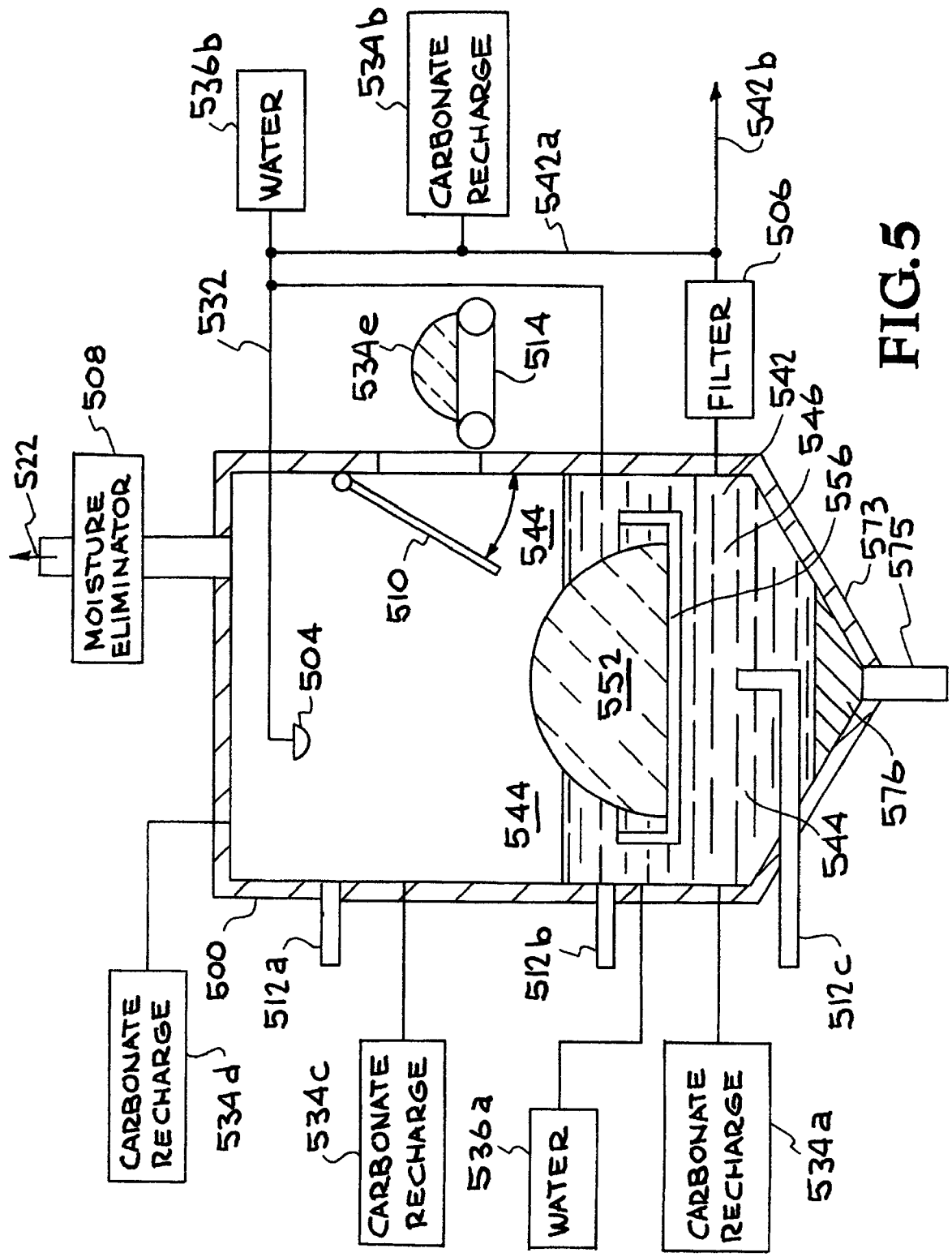
FIG. 5 illustrates further embodiments of the present invention comprising various means to handle the carbonate.

Further embodiments of the present invention comprising carbonate handling means, including means to add carbonate to the reactor vessel are shown in FIG. 5. Although the embodiments are depicted for the integrated configuration, these carbonate replenishment means are equally applicable to the sequential configuration as well. Unless otherwise stated, similarly numbered components are analogous to components in the previous figures. Aqueous solution 532 is introduced into the upper region of reactor vessel 500 via atomizer/sprayer unit 504. Aqueous solution 532 may be introduced directly into the lower region of the reactor vessel 500 as shown. Gas stream 512a enters the upper region of reactor vessel 500 where it contacts aqueous solution 532, which serves to hydrate $CO_2$, forming carbonic acid 544. Aqueous solution 532 that is unreacted and carbonic acid 544 travel by gravity flow to the lower region of reactor vessel 500 where they impinge and wet carbonate 552 contained therein. The gas stream 512b enters the lower region of reactor vessel 500 and becomes hydrated as it bubbles through a region of unreacted aqueous solution 532 forming carbonic acid 544. Alternatively, gas stream 512b may be bubbled into a region of carbonate solution 552 whereby the $CO_2$ hydration and carbonate-carbonic acid reactions occur in solution. The gas stream 512c enters the lower region of reactor vessel 500 and passes over or through wetted carbonate 552 wherein the $CO_2$ hydration and carbonate-carbonic acid reactions occur in close proximity. Prior to exiting from the reactor vessel 500, the $CO_2$-depleted gas stream 522 may be passed through a moisture-eliminator 508. The carbonic acid solution 544 reacts with carbonate 552 to form metal ion/bicarbonate solution 546. Mixture 542 comprises metal ion/bicarbonate solution 546, unreacted aqueous solution 532, and unreacted carbonic acid 544. Mixture 542 is bled from the reactor and disposed of as waste solution 542b and/or recirculated 542a. Water 536b may be added to mixture 542a as it is circulated back to atomizer/sprayer unit 504, or water 536a may be added directly to the lower region of the reactor vessel 500. Carbonate recharge means 534b is provided for adding carbonate to mixture 542a as it is recirculated. Carbonate recharge means 534a is provided for adding carbonate to the lower region of reactor vessel 500. Carbonate recharge means 534c is provided for blowing or spraying fine carbonate particles (dry, wetted or dissolved) into the reactor vessel 500. Carbonate recharge means 534d is provided for pouring carbonate into reactor 500. Carbonate 534e may be introduced into reactor vessel 500 via a moving structure such as conveyor belt 514, entering via port 510. To prevent entrainment of large particulate carbonate, mixture 542 may be passed through a solid/liquid separation means, such as a filter, 506. A liquid-porous container 556 may be used to hold particulate carbonate 552 which would facilitate replenishment as the carbonate becomes depleted. In the present invention, the reactor vessel 500 may have a tapered bottom section 573 in which solid residue 576 resulting from the carbonic acid/carbonate reaction may collect. The bottom section 573 has a closeable port 575 which allows removal of the solid residue 576.

Sequential $SO_2$ and $CO_2$ Removal (Conventional $SO_2$ Removal)

In the case of sulfur contamination, for example from coal-derived flue gas, it would be advantageous to place this $CO_2$ sequestering apparatus downstream from a $SO_2$ flue gas scrubber. The gaseous output from said scrubber would have had the sulfur largely removed so that the potential for downstream $SO_3^{2-}$ and/or $SO_4^{2-}$ formation would be reduced. One such flue gas desulfurization process which reacts limestone with water and $SO_2$ ultimately adds additional $CO_2$ to the already $CO_2$-rich waste gas stream. This $CO_2$ burden could be reduced by the downstream addition of a reactor type described here.

Figure 6:
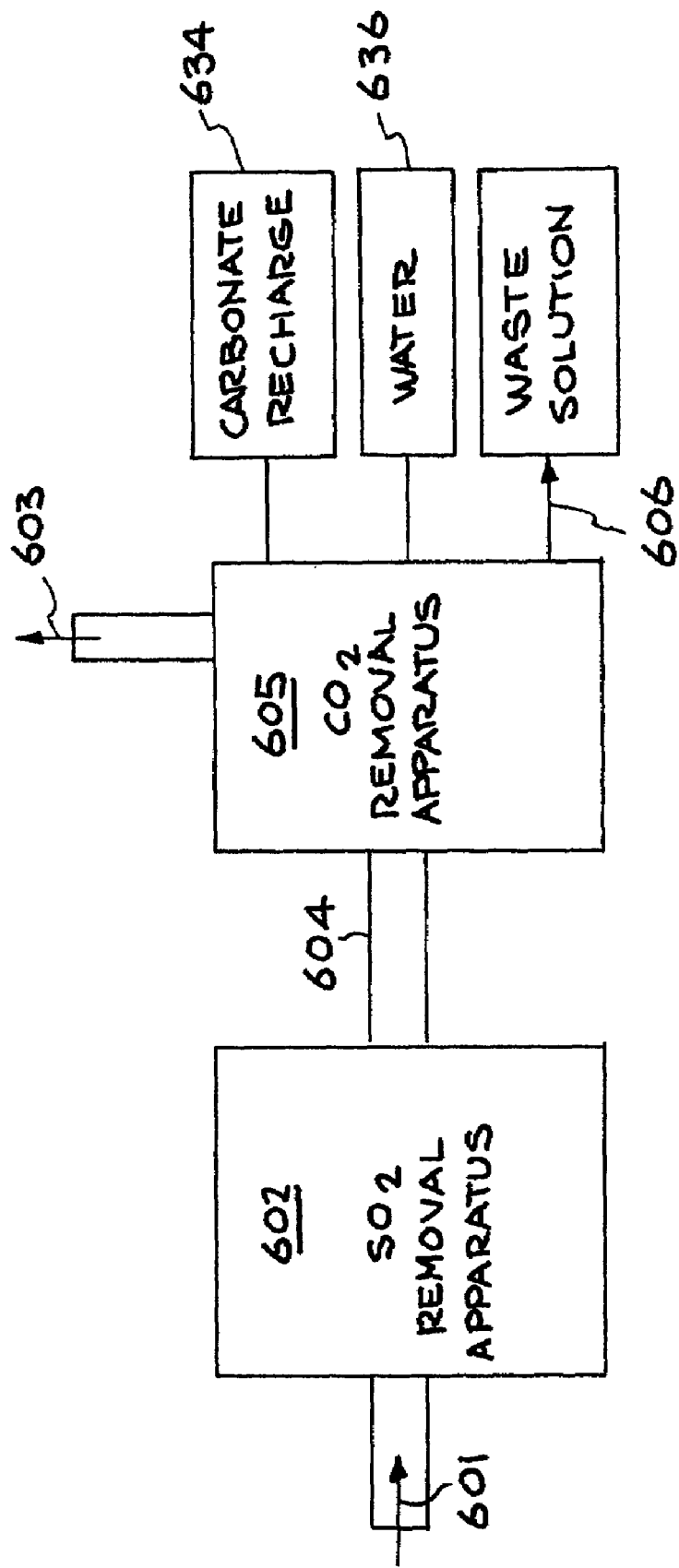
FIG. 6 illustrates an embodiment of the present invention comprising an apparatus that receives an $SO_2$ depleted gas stream, and proceeds to sequester $CO_2$ from said gas stream by means disclosed in FIGS. 1-5. The $SO_2$ depleted gas stream is received from an apparatus that removes the $SO_2$ by conventional means well known in the art.

Another embodiment according to the present invention is described hereunder with reference to FIG. 6. This embodiment comprises: an $SO_2$-removal apparatus 602 located upstream of the $CO_2$-removal apparatus 605 described in FIGS. 1-5. $SO_2$-removal apparatus 602 removes $SO_2$ from the incoming gas stream 601 by means well known in the art, such as is described in U.S. Pat. No. 5,788,944 which is incorporated herein by reference. Depleted-$SO_2$ gas stream 604 exits $SO_2$-removal apparatus 602 and enters $CO_2$ removal apparatus 605. Depleted-$SO_2$/$CO_2$ gas stream 603 exits $CO_2$-removal apparatus 605 as shown. Carbonate recharge 634 may be provided as shown. Water 636 may be added as shown. Metal ions/bicarbonate waste solution 606 exits the apparatus as shown.

Integrated $SO_2$ and $CO_2$ Removal $SO_2$ and $CO_2$ extraction and sequestration may be integrated into a single reactor with sufficient volume and carbonate surface area to allow both processes to proceed simultaneously. This presumes that certain possible end products or by-products of the sulfur reactions (e.g., $SO_3^-$ and $SO_4^{2-}$) are indeed deleterious to the carbonate-carbonic acid reaction, and can be removed, chemically bound, or otherwise do not occur in sufficient concentration to unacceptably hinder or impede the carbonate-carbonic acid reactions. If the reacted sulfur exists in such a reactor or its waste stream as $SO_3^-$ in solution with $HCO_3^-$, the former ions could be precipitated and removed as $CaSO_4$ via aeration of the reactor or waste solution. Integrated $SO_2$ and $CO_2$ reactors would be advantageous for new exhaust gas treatment installations, whereas addition of a separate downstream $CO_2$ reactor would be more cost effective in retrofit situations where a desulfurization reactor is already in place.

Figure 7:
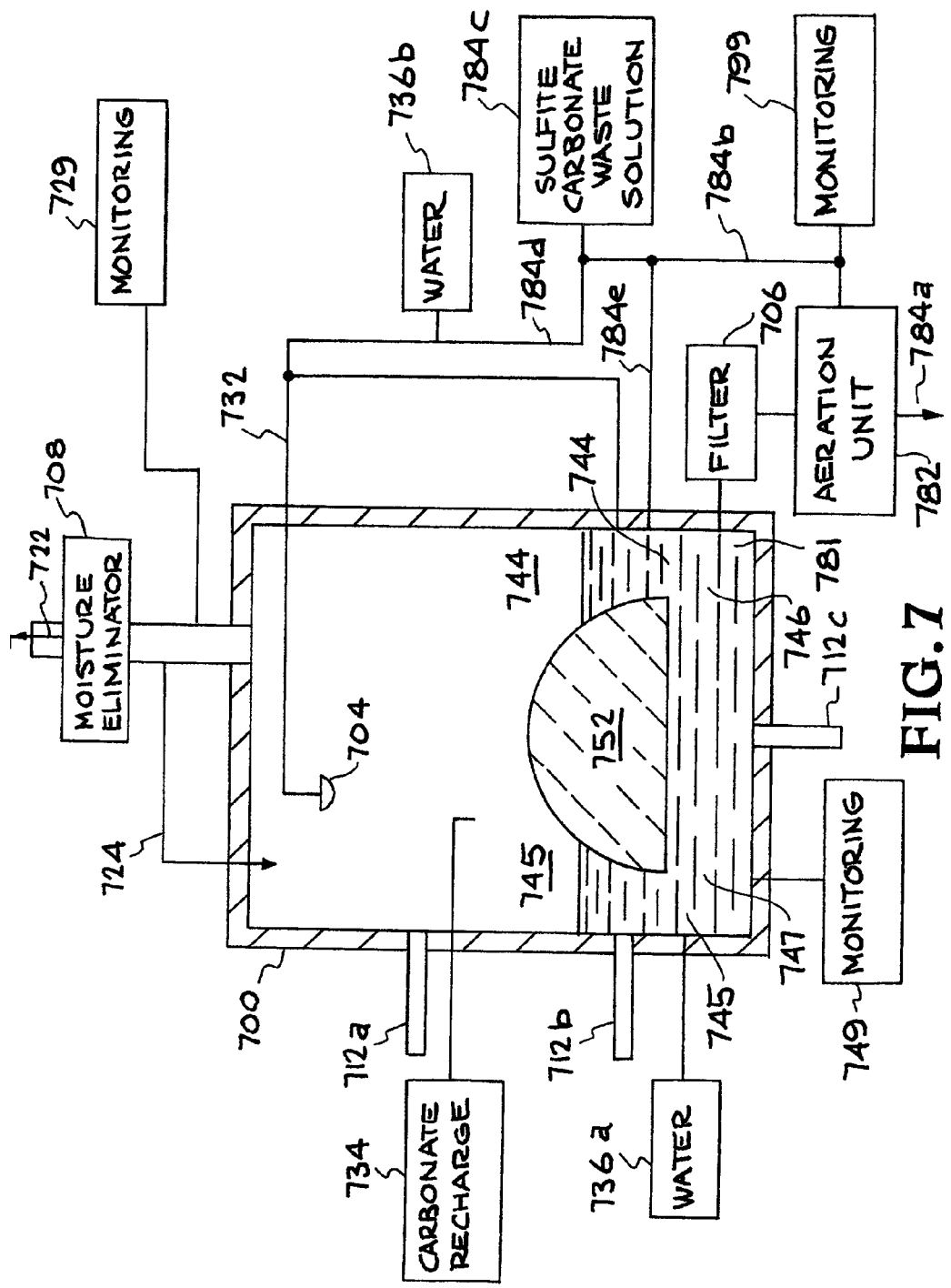
FIG. 7 illustrates an embodiment of the present invention comprising an integrated configuration that extracts and sequesters both $SO_2$ and $CO_2$ from a gas stream.

Further embodiments according to the present invention are described hereunder with reference to FIG. 7. In these embodiments, $SO_2$ and $CO_2$ removal from incoming gas streams 712$a,b,c$ occur in an integrated reactor 700 of the types described in FIGS. 1-5, but which is of sufficient volume and provides sufficient carbonate surface area to allow reaction and sequestration of both $SO_2$ and $CO_2$. Unless otherwise stated, similarly numbered components are analogous to components in the previous figures. When sulfur dioxide is hydrated, sulfurous acid is formed. The sulfurous acid reacts with carbonate to form metal ions and sulfite in solution, along with additional carbon dioxide. These embodiments described herein provide for sequestering this additional $CO_2$ as well as that present in the original gas stream. This additional $CO_2$ would be hydrated by aqueous solution present in the reactor. Although FIG. 7 shows just one integrated reactor, a cascading series of integrated reactors may be advantageous wherein the first reactors in the series remove the bulk of the $SO_2$, and the later reactors remove $CO_2$.

Incoming gas stream 712$a$ enters reactor 700 and is hydrated by aqueous solution 732 which has been introduced into the upper region of reactor vessel 700 in the form of mist or droplets via atomizer/sprayer unit 704. Aqueous solution 732 comprises water and may include one or more of the following: dissolved carbon dioxide, carbonic acid, sulfurous acid, metal ions, bicarbonate, particulate carbonate and dissolved carbonate. Contact between the gas stream 712$a$ and aqueous solution 732 serves to hydrate the $SO_2$ and $CO_2$, forming respectively, sulfurous acid 745 and carbonic acid 744. Aqueous solution 732 may also be introduced directly into the lower region of reactor vessel 700. Aqueous solution 732 that is unreacted, sulfurous acid 745 and carbonic acid 744, contact carbonate 752 contained in reactor vessel 700. The gas stream 712$b$ enters the lower region of reactor vessel 700 and becomes hydrated as it bubbles through a region of unreacted aqueous solution 732 forming sulfurous acid 745 and carbonic acid 744. Alternatively, the gas stream 712$b$ may be bubbled into a region of carbonate solution 752, whereby acid formation and acid/carbonate reactions occur in solution. The gas stream 712$c$ enters the lower region of reactor vessel 700 and passes over or through wetted carbonate 752 wherein the $SO_2$ and $CO_2$ hydration, and acid/carbonate reactions occur in close proximity. The $SO_2$/$CO_2$-depleted gas stream 722 exits the reactor vessel 700. Prior to exiting from the reactor vessel 700, the gas stream 722 may be passed through a moisture eliminator 708. Monitoring means 729 is provided for monitoring the $CO_2$ concentration in gas stream 722. The gas stream 722 may be recirculated 724 back into reactor vessel 700 should further $CO_2$ removal be necessary. The carbonic acid 744 reacts with carbonate 752 to form metal ions/bicarbonate solution 746. The sulfurous acid 745 reacts with carbonate 752 to form metal ions/sulfite solution 747 and additional $CO_2$. This additional $CO_2$ will also be hydrated to form additional carbonic acid 744 as it contacts aqueous solution 732. Mixture 781, comprising aqueous solution 732; sulfurous acid 745; metal ions/sulfite solution 747; carbonic acid 744; and metal ions/bicarbonate solution 746, is bled from the reactor, and may be passed through an aeration unit 782 which precipitates metal sulfate 784$a$. During such aeration, to prevent $CO_2$ removal and hence carbonate precipitation from the waste solution it would be advantageous to elevate the p$CO_2$ of the aerating gas. Aerated waste stream 784$b$ may be disposed of as waste solution 784$c$, recirculated 784$d$ back to the spray unit 704, and/or recirculated directly 784$e$ back to the lower region of reactor vessel 700 should sampling indicate that further reaction of the waste solution with the carbonate 752 is warranted. Additional water 736$b$ may be added to recirculated waste solution 784$d$ or may be added directly 736$a$ to the lower region of reactor vessel 700 as shown. Means 734 is provided for adding carbonate to reactor vessel 700. To prevent entrainment of large particulate carbonate in mixture 781, a solids/liquids separator 706 may be located at the exit port of the reactor vessel 700. Mixture 781 may contain waste products including $SO_3^-$, $HCO_3^-$, and metal ions in solution, plus any mineral sulfate precipitated in the reactor or in the waste solution stream. Monitoring means 749 and 799 are provided for measuring one or more solution chemistry parameters such as pH, p$CO_2$, conductivity, alkalinity, and/or metal ion concentration in mixture 781 (either within the reactor vessel or as the mixture is transported outside of the reactor vessel) and/or in other downstream solutions such as 784$b$).

Sequential $SO_2$ and $CO_2$ Removal

Figure 8:
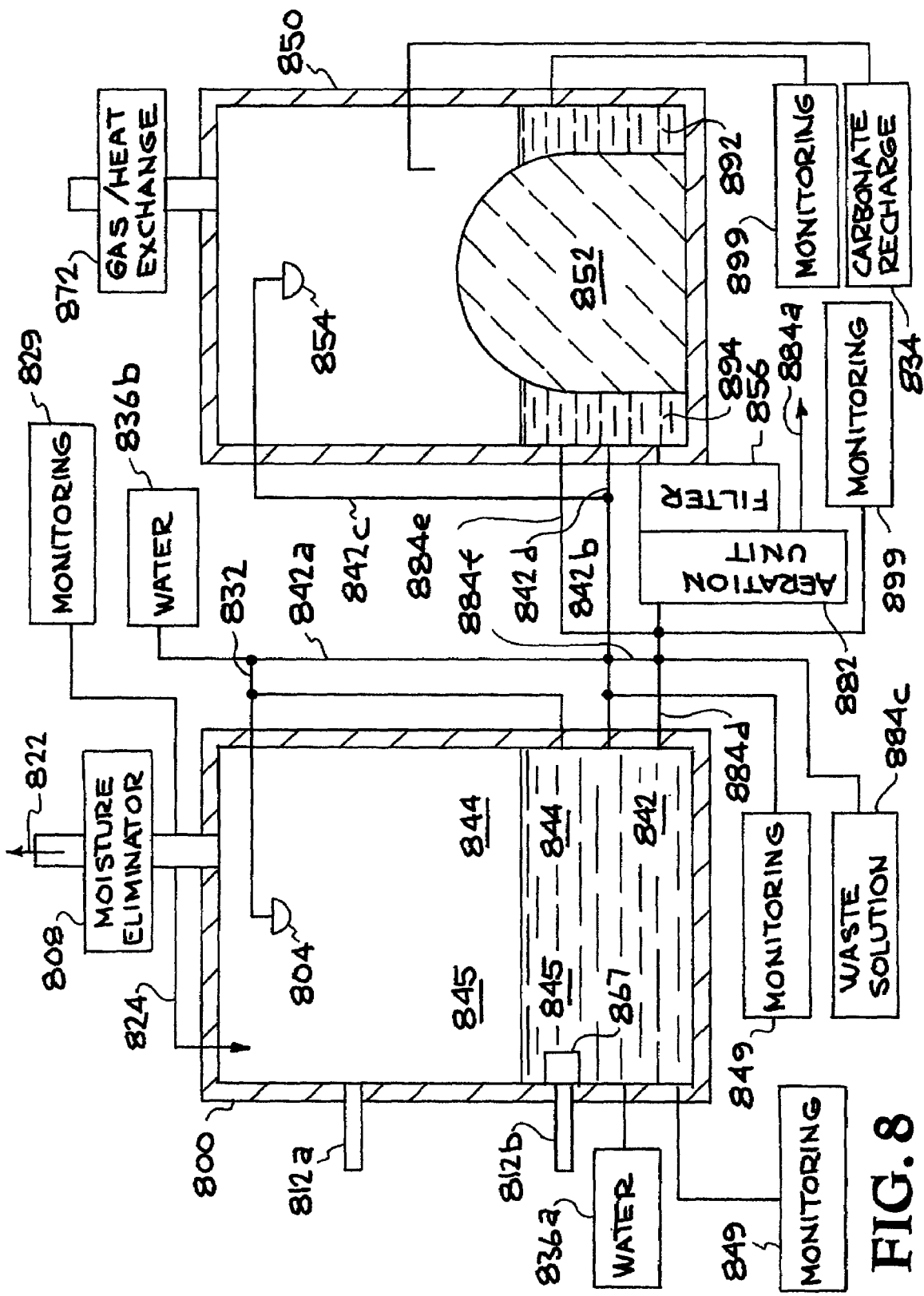
FIG. 8 illustrates an embodiment of the present invention comprising a sequential configuration that extracts and sequesters both $SO_2$ and $CO_2$ from a gas stream.

Further embodiments according to the present invention are described hereunder with reference to FIG. 8. In these embodiments, $SO_2$ and $CO_2$ removal from gas streams 812$a$ and $b$ occur in a sequential configuration of the types described in FIGS. 2-5, where the hydration vessel and carbonate reaction vessel are of sufficient volume and provide sufficient carbonate surface area to allow reaction and sequestration of both $SO_2$ and $CO_2$. Unless otherwise stated, similarly numbered components are analogous to components in the previous figures. When sulfur dioxide is hydrated, sulfurous acid is formed. The sulfurous acid reacts with carbonate to form metal ions and sulfite in solution, along with additional carbon dioxide. This present invention provides for sequestering this additional $CO_2$ as well as that present in the original gas stream. Incoming gas stream 812$a$ enters reactor 800 and is hydrated by aqueous solution 832 which has been introduced into the upper region of hydration vessel 800 in the form of mist or droplets via atomizer/sprayer unit 804. Aqueous solution 832 comprises water and may include one or more of the following: dissolved carbon dioxide, sulfur dioxide, carbonic acid, sulfurous acid, metal ions, bicarbonate, bisulfite, particulate carbonate, dissolved carbonate, particulate sulfate, and dissolved sulfate. Contact between the gas stream 812$a$ and aqueous solution 832 serves to hydrate the $SO_2$ and $CO_2$, forming respectively, sulfurous acid 845 and carbonic acid 844. Alternatively or in addition to gas stream 812a, gas stream 812b enters the lower region of hydration vessel 800 and becomes hydrated as it bubbles through a region of pooled liquid comprising unreacted aqueous solution 832, sulfurous acid 845 and carbonic acid 844. Gas stream 812b may be passed through gas diffuser 867 to enhance dispersal of the gas into said pooled liquid. Aqueous solution 832 may also be introduced directly into the lower region of hydration vessel 800. The $SO_2/CO_2$-depleted gas stream 822 exits the hydration vessel 800. Prior to exiting from the hydration vessel 800, the gas stream 822 may be passed through a moisture eliminator 808. Monitoring means 829 is provided for monitoring the $SO_2$ and $CO_2$ concentrations in gas stream 822. The gas stream 822 may be recirculated 824 back into hydration vessel 800 should further $SO_2$ and/or $CO_2$ removal be necessary. Mixture 842 comprises sulfurous acid 845, carbonic acid 844, aqueous solution 832 and may contain mixture 884d. Mixture 842 is transported to carbonate reaction vessel 850 as shown 842b, or recirculated 842a. Water 836b may be added to aqueous solution 832, or water 836a may be added directly to the lower region of the hydration vessel 800. Mixture 842b may be introduced into the upper region of carbonate reaction vessel 850 in the form of mist or droplets 842c via atomizer/sprayer unit 854, and/or directly 842d into the lower region of carbonate reaction vessel 850. Mixture 842c and/or 842d react with carbonate 852 contained in the lower region of carbonate reactor 850 to form metal ions/bicarbonate/sulfite solution 894. Any $CO_2$ resulting from the reaction of sulfurous acid contained in mixtures 842c and 842d with carbonate 852 will be hydrated by the same said mixtures to form carbonic acid. Mixture 892 comprises metal ion/bicarbonate/sulfite solution 894 and unreacted mixtures 842c and 842d which have pooled in the lower region of carbonate reaction vessel 850. Means 834 for adding carbonate to reactor vessel 850 is provided. Mixture 892 is bled from the carbonate reaction vessel, and may be passed through a solid/liquid separation means, such as a filter 856, in order to prevent entrainment of particulates. Mixture 892 may also be passed through an aeration unit 882 which precipitates metal sulfate 884a. During such aeration, to prevent net $CO_2$ removal and hence carbonate precipitation from the waste solution it would be advantageous to elevate the $pCO_2$ of the aerating gas so that it equals the $pCO_2$ of solution 892. Aerated waste stream 884b may be disposed of as waste solution 884c, recirculated 884d back to hydration vessel 800 for facilitating further $SO_2$ and $CO_2$ hydration, added 884f to recirculated mixtures 842a,b, and/or recirculated directly 884e back to the lower region of reactor vessel 800 should sampling indicate that further reaction of the waste solution with the carbonate 852 is warranted. Mixture 892 may contain waste products including $HSO_3^-$ $SO_3^{2-}$, $HCO_3^-$, and metal ions in solution, plus any mineral sulfate and carbonate precipitated in the reactor or contained in the waste solution stream. Monitoring means 849 and 899 are provided for measuring one or more solution chemistry parameters such as pH, pCO, conductivity, alkalinity, and/or metal ion concentration in mixtures 842 and 892 and/or in downstream solutions such as 842b and 884d. Carbonate reaction vessel 850 may also contain gas/heat exchange means 872 whereby gas is vented and heat may be exchanged with the ambient atmosphere to moderate interior gas pressure and temperature.

Waste Stream Solution Chemistry Modification

To minimize degassing and loss of $CO_2$ from the waste stream solution to the atmosphere as well as to minimize carbonate precipitation, various means may be used, including pre-treatment of the waste stream solution before release, and consideration of the disposal site into which the waste stream solution will be released.

Pre-treatment of the waste stream solution may include $CO_2$ degassing, dilution with an undersaturated solution, chemical additives, ion exchange, and modification of density, temperature or solute concentrations. $CO_2$ degassing may be passive wherein the waste stream solution is allowed to degas to an overlying headspace whose $pCO_2$ is less than that of the waste stream solution. Active degassing may be accomplished by purging with a gas stream (such as air) whose $pCO_2$ is less than that of the waste stream solution. Degassing could also be induced by applying a (partial) vacuum to the headspace above the waste stream solution. The degassed $CO_2$ may be recycled back to the input gas stream of the $CO_2$ hydration/carbonate reactor for further capture and sequestration. The waste stream solution may be diluted with a solution which is undersaturated with respect to $CO_2$ and/or carbonate ions. Such dilution would include dilution with water (freshwater or seawater) before release into the disposal site, or the natural mixing and dilution that would occur after the waste stream solution were released into a large body of water (freshwater or seawater, size on the order of a river, lake, sea or ocean). Certain chemicals, including phosphate, metals, and EDTA and other organic compounds (including: humic substances, aromatic acids, citrate, malate, pyruvate, glycelglycerine, glycogen, arginine, glutamate, glycine, glycoprotein succinate, taurine, chondroitin sulfate, galactose, dextrose and acetate) may be added to the waste stream solution to impede carbonate precipitation.

To reduce the potential for carbonate precipitation, at least some of the $Ca^{2+}$ cations in the waste stream solution may be replaced with cations which when balanced by the $CO_3^{2-}$ anions exhibit great solubility and less propensity for precipitation than does $CaCO_3$. One means of achieving this is by passing the waste stream solution through an ion exchange resin containing weakly attached exchangeable ions. $Ca^{2+}$ ions can be at least partially removed from water (water softening) by passing the water through a cation exchange column where the exchangeable ions on the resin are $Na^+$ such that 2Na+ replaces at least some of the $Ca^{2+}$ in solution and the $Ca^{2+}$ is bound to the resin. Thus at least some of the original $CaCO_3$ dissolved in the original solution is thus converted to the more soluble $Na_2CO_3$. Ca can be removed from the resin and the resin recharged with Na by passing a concentrated NaCl solution through the resin forming a waste solution of $CaCl_2$ and residual NaCl which can be used for other purposes or discarded. Use of replacement cations other than Na+ can be considered as long as the solubility of the dissolved carbonate so obtained is greater than that of $CaCO_3$.

At least some of the $CO_3^{2-}$ anions may be removed from the waste stream solution by passage through an anion exchange column wherein $CO_3^{2-}$ is replaced by another anion (e.g. $2Cl^-$). The $CO_3^{2-}$ is retained by the resin, producing $CaCl_2$ in the solution. The resin could ultimately be regenerated via passage of a solution of concentrated NaCl through the resin forming a solution of $Na_2CO_3$ and residual NaCl, which could be use for other purposes or discarded.

Through similar ion exchange processes to those above, at least some of the $Ca(HCO_3)_2$ dissolved in the waste stream solution may be converted to non-Ca moieties, or the $HCO_3^-$ concentration reduced, with the eluates from the resin regeneration step used for other purposes or discarded.

The density of the waste stream solution may be adjusted, preferably increased, to facilitate sinking and mixing of the waste stream solution with the disposal site solution. The density may be adjusted upward via a decrease in the waste stream solution temperature and/or an increase in solute concentrations.

Selection of the disposal site should consider various factors. The preferred disposal site is a large body of water, such as a river, lake, sea or ocean. It is preferred that the $pCO_2$ and/or carbonate ion concentration of the disposal site solution at the point of release of the waste stream solution into the disposal site be lower than that of the waste stream solution. The depth at which the waste stream solution is released into the disposal site solution is also a consideration so as to minimize contact with the atmosphere and hence CO2 degassing and carbonate precipitation. In this regard it is preferred that the depth of release be below the pycnocline. Although release below the pycnocline is preferred, disposal of the waste solution at or near the ocean surface may also be acceptable if: i) mixing and dilution with surface seawater is sufficiently rapid and/or ii) the concentration of certain ions or compounds naturally in seawater are sufficient to at least partially impede carbonate precipitation. Also, because of the high $CO_3^{2-}$ concentration of the waste effluent, it may be advantageous to release this effluent in the vicinity of coral reefs, so as to prevent environmental degradation of the reefs that have or will result from reductions in ambient $CO_3^{2-}$ concentrations via anthropogenic increases in atmospheric and, by equilibration, surface ocean $CO_2$ concentrations.

Although surface seawater is supersaturated with respect to calcite, precipitation is kinetically impeded by the presence of certain naturally occurring ions and organic compounds in the seawater which can complex or associate with $Ca^{2+}$. Such ions or compounds thus far shown to affect carbonate precipitation include: $Mg^{2+}$, phosphate, and various organic compounds including: humic substances, aromatic acids, citrate, malate, pyruvate, glycelglycerine, glycogen, arginine, glutamate, glycine, glycoprotein succinate, taurine, chondroitin sulfate, galactose, dextrose and acetate.

It is more preferred that the geographic location and depth of the waste stream solution release be selected so that natural water currents within the disposal site solution facilitate the mixing and dilution of the waste stream solution and reduce its contact with the atmosphere. Increasing depths of release also brings increasing pressure and decreasing temperature both of which impede carbonate precipitation. It is also preferred that the release depth be below the CCD.

A further embodiment is where the reactor vessels (integrated or separate hydration and/or carbonate) are located on a ship, barge, train, truck, automobile or any other means of conveyance. Locating the reactor vessels on or near a large body of water (e.g., river, lake, sea or ocean) would be advantageous because it could allow the relatively inexpensive over-water transport of carbonate, provide a ready source of water for the reactor, and provide a place to dispose of the reactor's relatively benign-liquid waste stream.

A further embodiment is where the gas stream containing $CO_2$ comprises exhaust gas from various modes of transportation, allowing one to sequester $CO_2$ from these mobile sources, such modes including but not limited to seacraft, aircraft, and land based vehicles such as trains, trucks, buses, and automobiles.

Obviously numerous modifications and variations of the present invention are possible in the light of the above teachings. It is therefore to be understood that within the scope of the appended claims the invention may be practiced otherwise than as specifically described therein.

What is claimed is:

1. An apparatus for extracting and sequestering $CO_2$ from a gas stream, comprising:

a reactor vessel;

an aqueous solution;

means for introducing said gas stream into said reactor vessel;

carbonate disposed in said reactor vessel, wherein said carbonate is of the form $X(CO_3)_m$ wherein X is any element or combination of elements that can chemically bond with a carbonate group or its multiple, wherein at least one said element is a group IA, IIA, IIIA, IVA, IB, IIB, IIIB, IVB, VB, VIIB, VIIB, or VIIIB element of the periodic table, and wherein m is a stoichiometrically determined positive integer;

means for hydrating said $CO_2$ with said aqueous solution to form carbonic acid, thereby resulting in a $CO_2$-depleted gas stream;

means for removing said $CO_2$-depleted gas stream from said reactor vessel;

means for reacting said carbonate with said carbonic acid to form a waste stream solution of metal ions and bicarbonate;

means for removing said waste stream solution from said reactor vessel;

an ion exchange device for pre-treating said waste stream solution to reduce the amount of $CO_2$ outgassing and carbonate precipitation that may occur after said waste stream solution is released into a disposal site; and means for releasing said pretreated waste stream solution into said disposal site.

2. The apparatus as recited in claim 1 wherein:

said disposal site comprises a body of water that is either freshwater or seawater.

3. The apparatus as recited in claim 2 wherein:

the $pCO_2$ of said body of water at the point of release of waste stream solution is less than that of said waste stream solution.

4. The apparatus as recited in claim 2 wherein:

said releasing means comprises means for releasing said waste stream solution at a depth sufficient for mixing and dilution of said waste stream solution with said body of water to occur.

5. The apparatus as recited in claim 2 wherein:

said releasing means comprises means for releasing said waste stream solution at a depth wherein the pressure and temperature existent at said depth is sufficient to impede $CO_2$ outgassing to the atmosphere and carbonate precipitation.

6. The apparatus as recited in claim 2 wherein:

said body of water is either a sea or ocean; and said releasing means causes said waste stream solution to be released below the pycnocline.

7. The apparatus as recited in claim 2 wherein:

said body of water is either a sea or ocean; and said releasing means causes said waste stream solution to be released in the vicinity of a reef, above the pycnocline.

8. The apparatus as recited in claim 2 wherein:

said disposal site is a body of surface seawater having sufficient constituents that serve to impede carbonate precipitation, said constituents being phosphate, $Mg^{2+}$ ions, or phosphate and $Mg^{2+}$ ions.

9. The apparatus as recited in claim 2 wherein:

said disposal site is a body of surface seawater having sufficient organic compounds that serve to at least partially impede carbonate precipitation, said organic compounds selected from the group consisting of humic substances, aromatic acids, citrate, malate, pyruvate, glycelglycerine, glycogen, arginine, glutamate, glycine, glycoprotein succinate, taurine, chondroitin sulfate, galactose, dextrose and acetate.

10. The apparatus as recited in claim 2 wherein:
said body of water is either a sea or ocean;
and said pretreated waste stream solution is released at a depth below the carbonate compensation depth (CCD).

11. An apparatus for extracting and sequestering $CO_2$ from a gas stream, comprising:
a reactor vessel;
an aqueous solution;
means for introducing said gas stream into said reactor vessel;
carbonate disposed in said reactor vessel, wherein said carbonate is of the form $X(CO_3)_m$ wherein X is any element or combination of elements that can chemically bond with a carbonate group or its multiple, wherein at least one said element is a group IA, IIA, IIIA, IVA, IB, IIB, IIIB, IVB, VB, VIIB, VIIB, or VIIIB element of the periodic table, and
wherein m is a stoichiometrically determined positive integer;
means for hydrating said $CO_2$ with said aqueous solution to form carbonic acid, thereby resulting in a $CO_2$-depleted gas stream;
means for removing said $CO_2$-depleted gas stream from said reactor vessel;
means for reacting said carbonate with said carbonic acid to form a waste stream solution of metal ions and bicarbonate;
means for removing said waste stream solution from said reactor vessel;
an ion exchange device for pre-treating said waste stream solution by exchanging at least a portion of the $Ca^{2+}$ cations present in said waste solution with exchange cations which when balanced by the $CO_3^{2-}$ anions present in said waste solution exhibit greater solubility and less propensity for precipitation than does $CaCO_3$; and
means for releasing said pretreated waste stream solution into a disposal site.

12. The apparatus as recited in claim 11 wherein:
said ion exchange device comprises means for passing said waste stream solution through an ion exchange column, with said column containing $Na^+$ exchange ions.

13. An apparatus for extracting and sequestering $CO_2$ from a gas stream, comprising:
a reactor vessel;
an aqueous solution;
means for introducing said gas stream into said reactor vessel;
carbonate disposed in said reactor vessel, wherein said carbonate is of the form $X(CO_3)_m$ wherein X is any element or combination of elements that can chemically bond with a carbonate group or its multiple, wherein at least one said element is a group IA, IIA, IIIA, IVA, IB, IIB, IIIB, IVB, VB, VIB, VIIB, or VIIIB element of the periodic table, and
wherein m is a stoichiometrically determined positive integer;
means for hydrating said $CO_2$ with said aqueous solution to form carbonic acid, thereby resulting in a $CO_2$-depleted gas stream;
means for removing said $CO_2$-depleted gas stream from said reactor vessel;
means for reacting said carbonate with said carbonic acid to form a waste stream solution of metal ions and bicarbonate;
means for removing said waste stream solution from said reactor vessel;
an ion exchange device for pre-treating said waste stream solution by exchanging at least a portion of the $CO_3^{2-}$ anions present in said waste solution with other anions; and
means for releasing said pretreated waste stream solution into a disposal site.

* * * * *